US012658755B2

(12) United States Patent
Takahashi et al.

(10) Patent No.: US 12,658,755 B2
(45) Date of Patent: Jun. 16, 2026

(54) STATOR FOR ROTARY ELECTRIC MACHINE AND ROTARY ELECTRIC MACHINE

(71) Applicant: HITACHI ASTEMO, LTD., Hitachinaka (JP)

(72) Inventors: Miku Takahashi, Hitachinaka (JP); Yuji Kobayashi, Hitachinaka (JP); Yasuyuki Saito, Hitachinaka (JP); Noriaki Hino, Hitachinaka (JP); Shinji Yamazaki, Hitachinaka (JP); Takuya Miyagi, Hitachinaka (JP); Keisuke Tateno, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 157 days.

(21) Appl. No.: 18/264,338

(22) PCT Filed: Aug. 31, 2021

(86) PCT No.: PCT/JP2021/032029
§ 371 (c)(1),
(2) Date: Aug. 4, 2023

(87) PCT Pub. No.: WO2022/208929
PCT Pub. Date: Oct. 6, 2022

(65) Prior Publication Data
US 2024/0120793 A1     Apr. 11, 2024

(30) Foreign Application Priority Data
Mar. 29, 2021     (JP) ................................. 2021-056206

(51) Int. Cl.
H02K 3/28        (2006.01)
H02K 21/14       (2006.01)

(52) U.S. Cl.
CPC ............... H02K 3/28 (2013.01); H02K 21/14 (2013.01)

(58) Field of Classification Search
CPC ............. H02K 21/14; H02K 3/12; H02K 3/28
(Continued)

(56) References Cited

U.S. PATENT DOCUMENTS

| | | | | | |
|---|---|---|---|---|---|
| 7,471,004 | B2 * | 12/2008 | Kanazawa | ............... | H02P 25/22 |
| | | | | | 290/40 B |
| 9,240,707 | B2 * | 1/2016 | Takiguchi | ................ | H02K 3/28 |
| 9,425,666 | B2 * | 8/2016 | Ishigami | ................. | B60L 50/61 |
| 10,056,794 | B2 * | 8/2018 | Saito | .................... | H02K 1/2706 |

(Continued)

FOREIGN PATENT DOCUMENTS

| | | |
|---|---|---|
| WO | WO-2013/145976 A1 | 10/2013 |
| WO | WO-2017/168971 A1 | 10/2017 |

(Continued)

OTHER PUBLICATIONS

International Search Report with English Translation and Written Opinion dated Nov. 16, 2021 in corresponding International Patent Application No. PCT/JP2021/032029 (9 pages).

*Primary Examiner* — Alex W Mok
(74) *Attorney, Agent, or Firm* — Foley & Lardner LLP

(57) ABSTRACT

Provided are a stator for a rotary electric machine and the rotary electric machine. The stator includes a stator core, and a stator winding formed in a plurality of phases, the stator winding including a slot conductor and a crossover conductor configured to connect ends of a pair of the slot conductors, the ends placed at a same side of the pair of slot conductors. With the stator, the stator winding includes a plurality of phase winding groups configured to forma plurality of parallel circuits in each of the plurality of phases; the crossover conductor in each of the plurality of phase winding groups includes, at one of the coil ends, a first crossover conductor configured to connect the pair of slot conductors at Np=N1, and a second crossover conductor (Continued)

configured to connect the pair of slot conductors at Np=N1+ Nspp, where Np represents a slot pitch, N1 represents a predetermined natural number, and Nspp represents a number of the plurality of slots per pole and phase; and the first crossover conductor and the second crossover conductor are alternately arranged in a circumferential direction of the stator core.

8 Claims, 19 Drawing Sheets

(58) Field of Classification Search
USPC .......................................................... 310/208
See application file for complete search history.

(56) References Cited

U.S. PATENT DOCUMENTS

| | | | | |
|---|---|---|---|---|
| 10,340,756 | B2 * | 7/2019 | Saito ...................... | H02K 1/276 |
| 10,404,124 | B2 * | 9/2019 | Ikeda ..................... | H02K 1/274 |
| 10,491,070 | B2 * | 11/2019 | Tamura ................. | H02K 3/521 |
| 10,516,310 | B2 * | 12/2019 | Tamura ................... | H02K 3/18 |
| 2015/0091408 | A1 | 4/2015 | Azusawa et al. | |
| 2019/0027989 | A1 * | 1/2019 | Ishigami .............. | H02K 15/065 |
| 2019/0044403 | A1 | 2/2019 | Kano et al. | |
| 2019/0149004 | A1 | 5/2019 | Tamura et al. | |
| 2021/0367469 | A1 | 11/2021 | Yamamoto et al. | |

FOREIGN PATENT DOCUMENTS

| | | | |
|---|---|---|---|
| WO | WO-2018/012554 | A1 | 1/2018 |
| WO | WO-2020/195129 | A1 | 10/2020 |

* cited by examiner

THIRD EXAMPLE

*FIG. 19*

| | | 48 | 48 | 54 | 96 | 72 | 36 |
|---|---|---|---|---|---|---|---|
| NUMBER OF SLOTS | | 48 | 48 | 54 | 96 | 72 | 36 |
| NUMBER OF COILS PER SLOT | | 6 | 8 | 6 | 8 | 8 | 6 |
| NUMBER OF POLES | | 8 | 8 | 6 | 16 | 8 | 6 |
| NUMBER OF PARALLEL CIRCUITS | | 4 | 8 | 6 | 16 | 8 | 6 |
| NUMBER OF SLOTS PER POLE | N | 6 | 6 | 9 | 6 | 9 | 6 |
| NUMBER OF SLOTS PER POLE AND PHASE | Nspp | 2 | 2 | 3 | 2 | 3 | 2 |
| ANGLE OF JUMPER CONDUCTOR | J | 360 | 180 | 360 | 90 | 270 | 240 |
| PITCH ON CL SIDE 1 | N1 | 6 | 6 | 9 | 6 | 9 | 6 |
| PITCH ON CL SIDE 2 | N1+Nspp | 8 | 8 | 12 | 8 | 12 | 8 |
| PITCH ON OP SIDE | N2 | 5 | 5 | 8 | 5 | 8 | 5 |

STATOR FOR ROTARY ELECTRIC MACHINE AND ROTARY ELECTRIC MACHINE

TECHNICAL FIELD

The present invention relates to a stator for a rotary electric machine and the rotary electric machine.

BACKGROUND ART

A rotary electric machine used for driving a vehicle includes a stator core of annular shape, the stator core including a plurality of teeth and a plurality of slots between an adjoining two of the plurality of teeth, and needs to, in winding techniques for the stator core, fulfill requirements for a continuous, higher rated output. In response to the requirements, some techniques, such as a means for increasing an area (diameter) for coil conductor to be wound or a means for increasing the number of parallel circuits for each phase, have been developed to increase outputs without an increase in current density.

As a background of the present invention, PTL 1 below discloses, in order to simplify processes, a rotary electric machine including a plurality of segment coils; and at a coil end on a connection side, the rotary electric machine includes a first connection group and a second connection group. The first connection group includes a plurality of terminals for connecting a plurality of segments, and the second connection group connects layers different from those in the first connection group and includes a plurality of terminals.

CITATION LIST

Patent Literature

PTL 1: WO 2017/168971 A

SUMMARY OF INVENTION

Technical Problem

In the rotary electric machine disclosed in PTL 1, for example, when using a single type of slot pitch on a non-connection side and when the plurality of segment coils are wound in a single direction of wave winding, in four parallel circuits formed for the purpose of increasing the number of parallel circuits per phase, a phase difference arises. Further, when using the single type of slot pitch on the non-connection side and when the plurality of segment coils are wound in any directions of wave winding, the number of connectors for connecting the coil ends increases, leading to increased cost.

The present invention has been made in view of the above points, and an object of the present invention is to provide a stator for a rotary electric machine and the rotary electric machine, the stator configured to decrease the number of the connectors and increase the outputs.

Solution to Problem

In order to achieve the object, the present invention provides a stator for a rotary electric machine and the rotary electric machine, the stator including: a stator core including a plurality of slots; and a stator winding including a plurality of wavy circular windings in a plurality of phases, the stator winding including a slot conductor inserted into each of the plurality of slots of the stator core to form any one of a plurality of layers, and a crossover conductor configured to connect ends of a pair of the slot conductors, each of which is inserted into a different one of the plurality of slots, to form a coil end, the ends placed at a same side of the pair of slot conductors. With the stator, the stator winding includes a plurality of phase winding groups configured to form a plurality of parallel circuits in each of the plurality of phases; the crossover conductor in each of the plurality of phase winding groups includes, at one of the coil ends, a first crossover conductor configured to crossover the plurality of slots between the pair of slot conductors at $Np=N1$ to connect the pair of slot conductors, and a second crossover conductor configured to cross over the plurality of slots between the pair of slot conductors at $Np=N1+Nspp$ to connect the pair of slot conductors, where Np represents a slot pitch, N1 represents a predetermined natural number, and Nspp represents a number of the plurality of slots per pole and phase; and the first crossover conductor and the second crossover conductor are alternately arranged in a circumferential direction of the stator core.

Advantageous Effects of Invention

The present invention provides a stator for a rotary electric machine, the stator configured to decrease the number of connectors and increase outputs.

BRIEF DESCRIPTION OF DRAWINGS

FIG. 2 is a circuit diagram of a power converter.

FIG. 4 is a cross-sectional view of a stator and a rotor.

FIG. 8 is a first layout diagram of connectors according to the embodiment of the present invention.

FIG. 19 shows an example of arrangement of coils in the second connector layout of FIG. 9.

An embodiment of the present invention will be described below with reference to the drawings. Descriptions below and the appended drawings are merely illustrative for convenience of describing the present invention, and are omitted or simplified as appropriate for clarification of the description. The present invention may be implemented in other various manners. Unless otherwise limited, each component may be singular or plural.

A position, size, shape, range, or the like of each component illustrated in the appended drawings may not necessarily represent an actual position, size, shape, range, or the like, in order to facilitate understanding of the invention. Accordingly, the present invention is not necessarily limited to the position, size, shape, range, or the like disclosed in the appended drawings.

AN EMBODIMENT AND OVERALL CONFIGURATION

A stator for a rotary electric machine and the rotary electric machine, each according to the present invention, is applicable to a dedicated electric vehicle that travels using only a rotary electric machine or a hybrid electric vehicle driven by both of the rotary electric machine and an engine. In descriptions below, each of the stator and the rotary electric machine is applied to the hybrid electric vehicle as an example.

Figure 1:
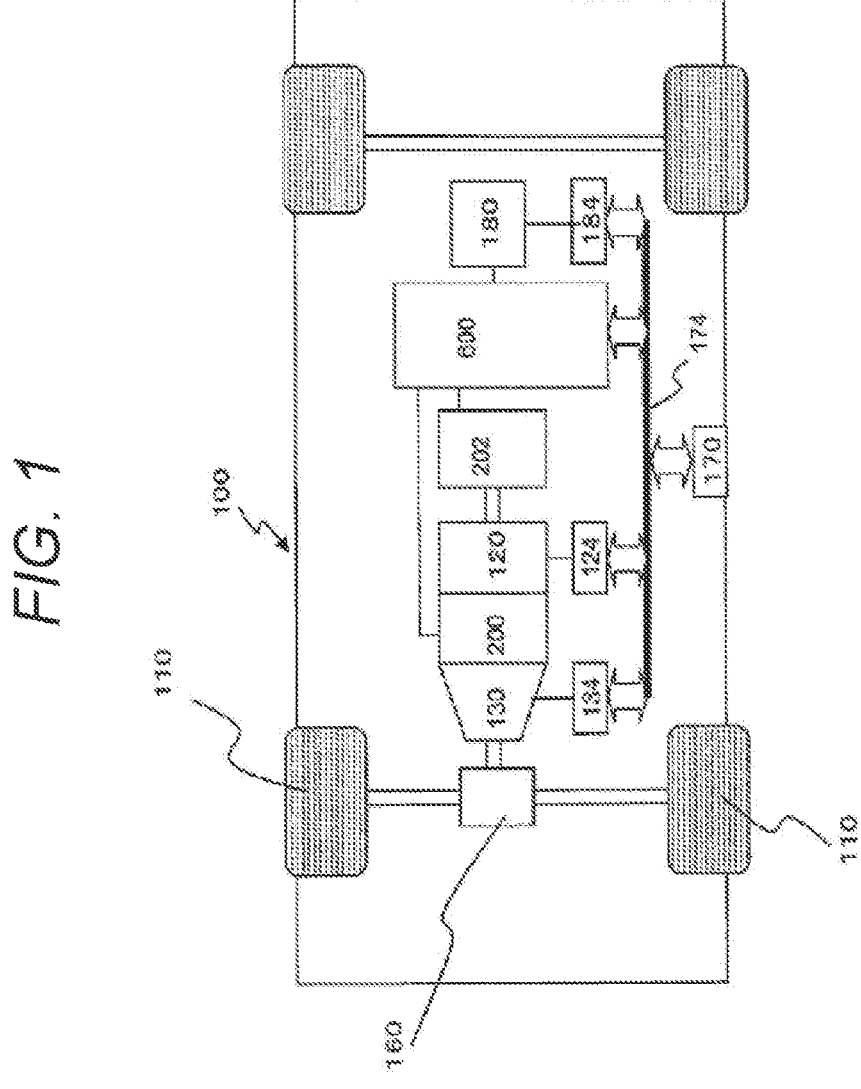
FIG. 1 is a schematic diagram of a hybrid electric vehicle according to an embodiment of the present invention.

FIG. 1 is a schematic diagram of a hybrid electric vehicle including a rotary electric machine according to an embodiment of the present invention.

A vehicle 100 includes an engine 120, a first rotary electric machine 200, a second rotary electric machine 202, and a battery 180. The vehicle 100 includes, in addition to the battery 180 having high voltage, a battery (not illustrated) for supplying low voltage power, e.g., 14-volt power, so as to supply direct current (DC) power to a control circuit as will be described below.

The battery 180 includes a secondary battery, such as a lithium ion battery or a nickel hydrogen battery, and outputs the DC power having high voltage of 250 volts to 600 volts or more.

When each of the first rotary electric machine 200 and the second rotary electric machine 202 is operated as an electric motor, or in other words, when driving force generated by the first and second rotary electric machines 200 and 202 is required, the battery 180 supplies the DC power to the first and second rotary electric machines 200 and 202 via a DC terminal of a power converter 600.

On the other hand, when each of the first and second rotary electric machine 200 and 202 is operated as a power generator, or in other words, during regenerative running, a rotor of each of the first and second rotary electric machines 200 and 202 is rotatably driven by a rotation torque applied from outside, thereby inducing three-phase alternating current (AC) power in a stator winding of a corresponding one of the first and second rotary electric machines 200 and 202. The three-phase AC power is converted to DC power by the power converter 600, and the DC power is supplied to battery 180 to charge the battery 180.

A battery control device 184 controls the battery 180, and outputs a charge/discharge state of the battery 180 or a state of each unit cell included in the battery 180 to an integrated control device 170 via a communication line 174. Having determined, based on information from the battery control device 184, that the battery 180 needs to be charged, the integrated control device 170 commands the power converter 600 for power generation operation.

The engine 120 is controlled by an engine control device 124, and a transmission 130 is controlled by a transmission control device 134. The rotation torque generated by the engine 120 together with each of the first and second rotary electric machines 200 and 202 is transmitted to front wheels 110 via the transmission 130 and a differential gear 160.

The integrated control device 170 is a higher-level control device than the engine control device 124, the transmission control device 134, the power converter 600, and the battery control device 184, and receives information from each of these control devices via the communication line 174, the information indicating a state of a functional unit controlled by the corresponding control device via the communication line 174. Based on the information received from each of these control devices, the integrated control device 170 calculates a control command for the corresponding control device. Each of the control commands calculated is transmitted to the corresponding control device via the communication line 174.

The integrated control device 170 mainly manages an output torque of each of the engine 120, the first rotary electric machine 200, and the second rotary electric machine 202, and calculates a total torque or a torque distribution ratio between the output torque of the engine 120 and the output torque of the first rotary electric machine 200 or the second rotary electric machine 202. The integrated control device 170 transmits the control command based on the calculation above to the transmission control device 134, the engine control device 124, and the power converter 600.

The power converter 600 includes a power semiconductor (as will be described in FIG. 2) included in an inverter circuit for operating each of the first and second rotary electric machines 200 and 202. The power converter 600 controls a switching operation of the power semiconductor based on the torque command from the integrated control device 170 to output a torque or generate power in accordance with the torque command. The switching operation of the power semiconductor operates each of the first and second rotary electric machines 200 and 202 as the electric motor or the power generator.

Figure 2:
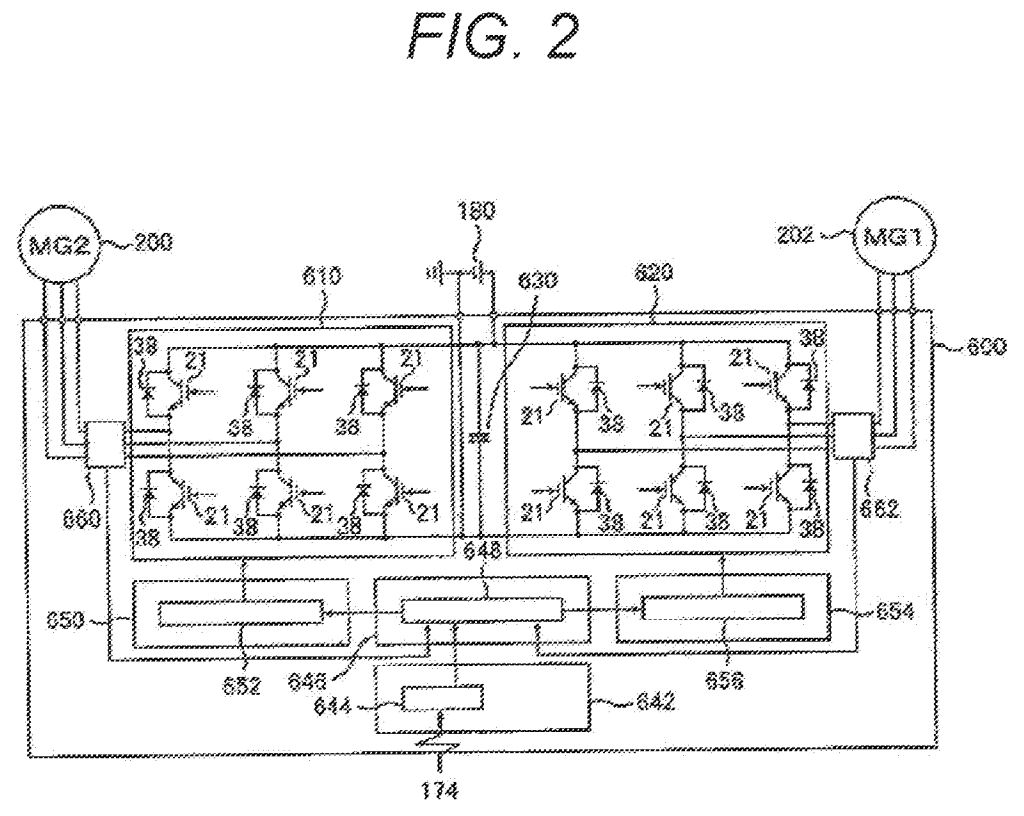

FIG. 2 is a circuit diagram of the power converter 600 in FIG. 1.

The power converter 600 includes a first inverter device for the first rotary electric machine 200, and a second inverter device for the second rotary electric machine 202.

The first inverter device includes a power module 610, a first drive circuit 652 for controlling a switching operation of each power semiconductor 21 in the power module 610, and a current sensor 660 for detecting current of the first rotary electric machine 200. The first drive circuit 652 is placed on a drive circuit board 650.

Concurrently, the second inverter device includes a power module 620, a second drive circuit 656 for controlling a switching operation of each power semiconductor 21 in the power module 620, and a current sensor 662 for detecting current of the second rotary electric machine 202. The second drive circuit 656 is placed on a drive circuit board 654.

The power module 610 and the power module 620 are respectively operated by drive signals outputted from the first drive circuit 652 and second drive circuit 656. The power modules 610 and 620 respectively convert the DC power supplied from the battery 180 to the three-phase AC power, and respectively supply the three-phase AC power to the stator windings as armature windings of the first and second rotary electric machines 200 and 202. Further, the power modules 610 and 620 respectively convert the AC power induced by the stator windings of the first and second rotary electric machines 200 and 202 to the DC power and supply the DC power to the battery 180 having high voltage.

The power modules 610 and 620 respectively include three-phase bridge circuits, and series circuits in correspondence to the three-phase bridge circuits are electrically connected in parallel between a positive electrode and a negative electrode of the battery 180. Each of the series circuits includes the power semiconductor 21 for an upper arm, and the power semiconductor 21 for a lower arm, and these power semiconductors 21 are connected in series. The power module 610 and the power module 620 have a substantially same circuit configuration, and the power module 610 will be described below as representative of these two power modules.

In this embodiment, in the power module 610, an insulated gate bipolar transistor (IGBT) 21 is used as a switching power semiconductor element. The IGBT 21 includes three electrodes as a collector electrode, an emitter electrode, and a gate electrode. Between the collector electrode and the emitter electrode of the IGBT 21, a diode 38 is electrically connected.

The diode 38 includes two electrodes as a cathode electrode and an anode electrode. The cathode electrode is electrically connected to the collector electrode of the IGBT 21, and the anode electrode is electrically connected to the emitter electrode of the IGBT 21, so that a direction from the emitter electrode to the collector electrode of the IGBT 21 is a forward direction.

The switching power semiconductor element may be a metal-oxide semiconductor field-effect transistor (MOSFET). The MOSFET includes three electrodes as a drain electrode, a source electrode, and a gate electrode. The MOSFET includes a parasitic diode between the source electrode and the drain electrode such that a direction from the drain electrode to the source electrode is the forward direction. Thus, the diode 38 is not necessarily included in the power module.

In the arms in each of the three phases, the emitter electrode of the corresponding IGBT 21 and the collector electrode of the corresponding IGBT 21 are electrically connected in series. Here, a single IGBT is illustrated for the upper arm and for the lower arm in each of the three phases, but in this embodiment, a plurality of the IGBTs are actually electrically connected in parallel such that a large current capacity is controlled.

In an example of FIG. 2, in each of the three phases, the upper and lower arms respectively include three of the IGBTs. In each of the three phases, the upper arm has the collector electrode of the IGBT 21 electrically connected to the positive electrode of the battery 180, and the lower arm has the source electrode of the IGBT 21 electrically connected to the negative electrode of the battery 180. In each of the three phases, the upper arm and the lower arm have a midpoint (where the emitter electrode of the IGBT of the upper arm and the collector electrode of the IGBT of the lower arm are connected) therebetween, and the midpoint is electrically connected to the armature winding (stator winding) of the corresponding phase of the first rotary electric machine 200 or the second rotary electric machine 202.

The first inverter device and the second inverter device share a control circuit 648 placed on a control circuit board 646, a capacitor module 630, and a transmission/reception circuit 644 mounted on a connector board 642, respectively via the first drive circuit 652 and the second drive circuit 656.

The first drive circuit 652 and the second drive circuit 656 respectively represent drive units for controlling the first inverter device and the second inverter device, and generate drive signals for driving the IGBTs 21 based on control signals outputted from the control circuit 648. The drive signals generated in the first drive circuit 652 and the second drive circuit 656 are respectively outputted to the gates of the power semiconductor elements of the power module 610 and of the power module 620. The first drive circuit 652 and the second drive circuit 656 respectively include six integrated circuits for generating the drive signals supplied to gates of the upper and lower arms in each of the three phases, and the six integrated circuits represent one block.

The control circuit 648 represents a control unit for the first and second inverter devices, and includes a microcomputer for calculating control signals (control values) for operating (turning on/off) a plurality of the switching power semiconductor elements. The control circuit 648 receives inputs of a torque command signal (torque command value) from the higher-level control device, sensor outputs from the current sensors 660 and 662, and sensor outputs from rotation sensors included in the first and second rotary electric machines 200 and 202. The control circuit 648 calculates the control values based on the inputs to output the control signals for controlling switching timing on the first and second drive circuits 652 and 656.

The transmission/reception circuit 644 mounted on the connector board 642 electrically connects the power converter 600 with an external control device, and transmit/receives information to/from other devices via the communication line 174.

The capacitor module 630 represents a smoothing circuit for controlling a variation in DC voltage caused by the switching operation of the IGBT 21, and is electrically connected in parallel to the DC terminal in the first power module 610 or the second power module 620.

Figure 3:
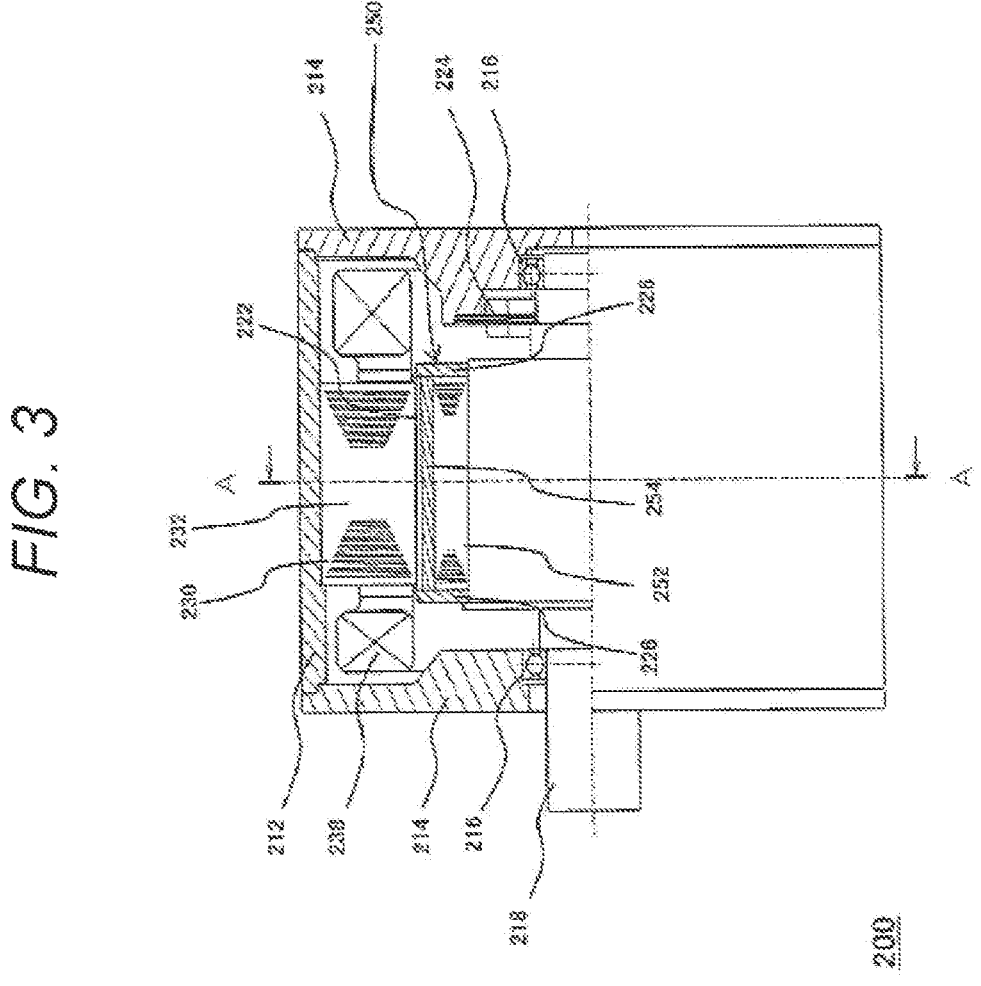
FIG. 3 is a cross-sectional view of a rotary electric machine in FIG. 1.

FIG. 3 is a cross-sectional view of the first rotary electric machine 200 in FIG. 1. The first rotary electric machine 200 and the second rotary electric machine 202 have a substantially same structure, and the structure of the first rotary electric machine 200 will be described below as representative of these two rotary electric machines. Note that, the structure below is not necessarily applied to both of the first and second rotary electric machines 200 and 202, and may be applied to only one of the first and second rotary electric machines 200 and 202.

A housing 212 accommodates a stator 230. The stator 230 includes a stator core 232 and a stator winding 238. The stator core 232 has an inner circumference where the rotor 250 is rotatably held via an air gap 222.

The rotor 250 includes a rotor core 252 fixed to a shaft 218, a permanent magnet 254, and a non-magnetic wear plate 226. The housing 212 includes a pair of end brackets 214, each including a bearing 216, and the shaft 218 is rotatably held by the bearing 216.

The shaft 218 includes a resolver 224 for detecting a position of poles or rotation rate of the rotor 250. Outputs from the resolver 224 are captured by the control circuit 648 (FIG. 2).

The power module 610 (FIG. 2) carries out the switching operation based on the control signal, and converts the DC power supplied from the battery 180 to the three-phase AC power. The three-phase AC power is supplied to the stator winding 238 to generate a rotating magnetic field in the stator 230. The three-phase AC power has a frequency controlled based on output values from the resolver 224, and the phases of the three-phase AC power relative to the rotor 250 are also controlled based on the output values from the resolver 224.

Figure 4:
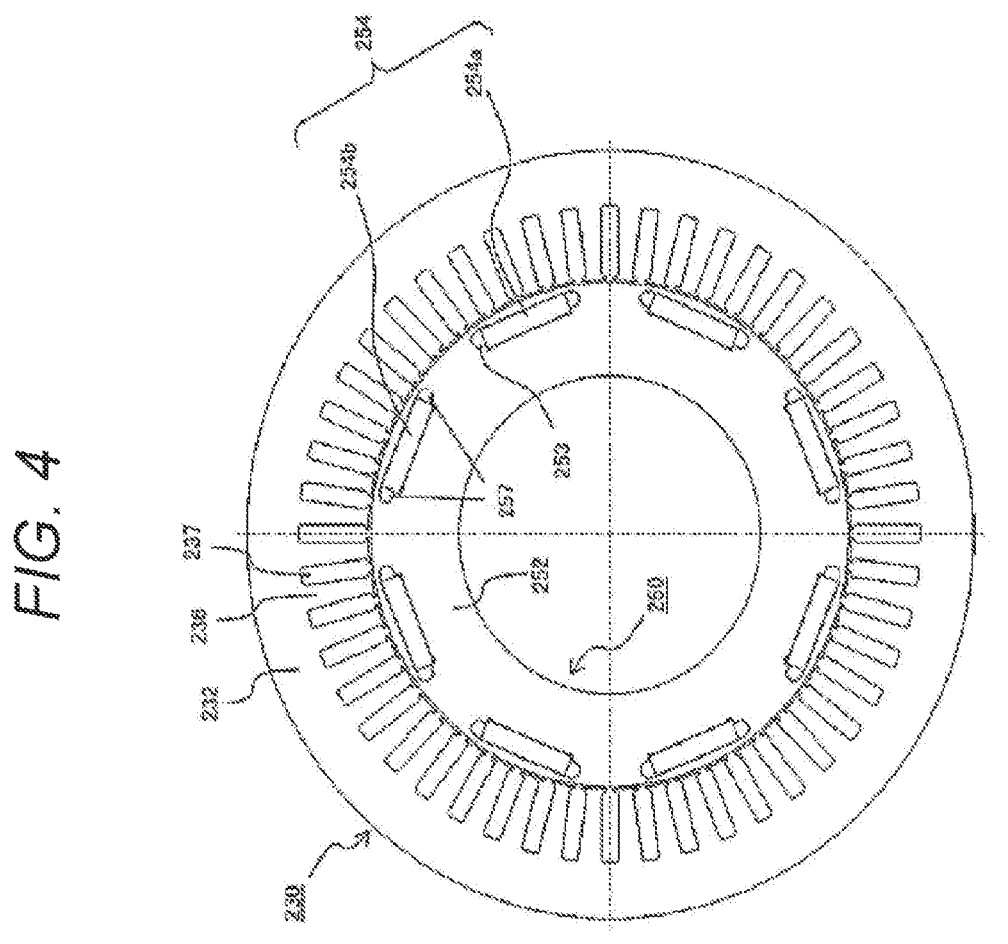

FIG. 4 is a cross-sectional view of the stator 230 and the rotor 250. FIG. 4 is a cross-sectional view taken along line A-A in FIG. 3, and the housing 212, the shaft 218, and the stator winding 238 are omitted.

The stator core 232 includes slots 237 and teeth 236 arranged evenly over an entire edge of the inner circumference. In FIG. 4, not all the slots and teeth are denoted with reference signs, but only one of the slots and teeth are representatively denoted with the reference signs. Each of the slots 237 internally includes a slot insulating material (not illustrated), and a plurality of phase windings of U phase, V phase, and W phase included in the stator windings 238 (FIG. 3) are attached to the slots 237. In this embodiment, the number of the slots 237 spaced evenly from each other is 48.

In a vicinity of outer circumference of the rotor core 252, eight pits 253, into which magnets of rectangular shape are to be inserted, are arranged at an equal distance from each other in a circumferential direction. Each of the eight pits 253 are arranged in an axial direction, and has the corresponding permanent magnet 254 embedded and fixed with an adhesive or others therein.

The permanent magnet 254 functions as a field pole of the rotor 250, and in this embodiment, includes eight poles. Each of the eight pits 253 has a circumferential width greater than a circumferential width of the permanent magnet 254 (a permanent magnet 254a and a permanent magnet 254b), and a pit space 257 at each side of the permanent magnet 254 functions as a magnetic air gap. The pit space 257 may be filled with the adhesive or may be filled with a molding resin to be integrally formed with the permanent magnet 254.

The permanent magnet 254 has a magnetization direction oriented radially, and the magnetization direction is reversed alternately in the field poles. In other words, when the permanent magnet 254a has a side surface near the stator as N pole and a side surface near the shaft as S pole, the permanent magnet 254b adjoining the permanent magnet 254a has a side surface near the stator as S pole and a side surface near the shaft as N pole. The permanent magnets 254a and 254b are alternately arranged in the circumferential direction.

The permanent magnet 254 may be inserted into each of the eight pits 253 of the rotor core 252 after being magnetized, or may be magnetized by a strong magnetic field after being inserted into a corresponding one of the eight pits 253. Here, the permanent magnet 254 magnetized is a strong magnet. Thus, when the permanent magnet 254 magnetized is fixed to the rotor 250, strong aspiration is generated between the permanent magnet 254 and the rotor core 252, and assembly is thereby hindered. Further, the strong aspiration of the permanent magnet 254 may attract dust, such as iron powder, to the permanent magnet 254. Accordingly, when productivity of the rotary electric machine is considered, the permanent magnet 254 is preferably magnetized after inserted into the rotor core 252.

The permanent magnet 254 may be neodymium-based or samarium-based sintered magnet, ferrite magnet, neodymium-based bonded magnet, or others. The permanent magnet 254 has a remanence of approximately 0.4 to 1.4 T.

When three-phase AC currents are applied to the stator winding 238 (FIG. 3), the rotating magnetic field is generated in the stator 230. Then, the rotating magnetic field acts on the permanent magnets 254a and 254b of the rotor 250 to generate the torque. The torque is expressed as the product of a component interlinking with each of the phase windings, the component out of magnetic fluxes outputted from the permanent magnet 254, and a component perpendicular to an interlinkage flux of the three-phase AC current flowing in the corresponding phase winding.

Here, the three-phase AC current is controlled to have a sine waveform, so that the product of a fundamental wave component of the interlinkage flux and a fundamental wave component of the three-phase AC current is a time-averaged component of the torque, and the product of a harmonic component of the interlinkage flux and the fundamental wave component of the three-phase AC current is a torque ripple as a harmonic component of the torque. In other words, in order to reduce the torque ripple, the harmonic component of the interlinkage flux is desirably reduced. In other words, the product of the interlinkage flux and an angular velocity of rotation of the rotor is an induced voltage, and reduction in the harmonic component of the interlinkage flux is thus equivalent to reduction in the harmonic component of the induced voltage.

Figure 5:
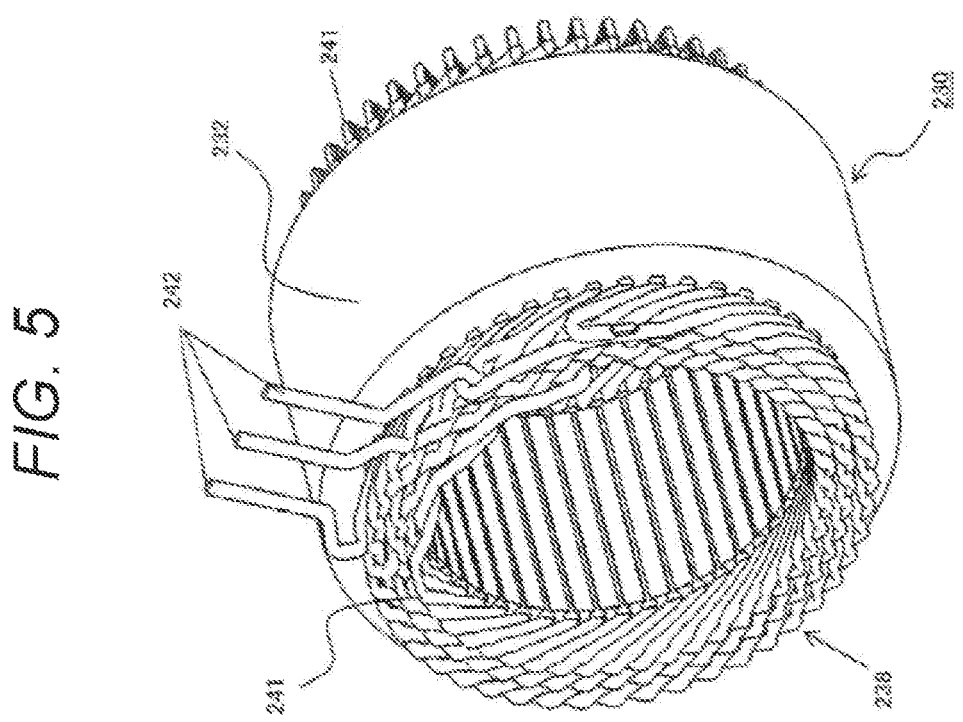
FIG. 5 is a perspective view of the stator.

FIG. 5 is a perspective view of the stator 230.

In this embodiment, the stator winding 238 is wound around the stator core 232 by wave winding. The stator core 232 has, on its both end surfaces, a coil end 241 of the stator winding 238 formed. On one of the end surfaces of the stator core 232, a lead wire 242 of the stator winding 238 is drawn. The lead wire 242 is drawn in correspondence to each of the U phase, the V phase, and the W phase.

Figure 6:
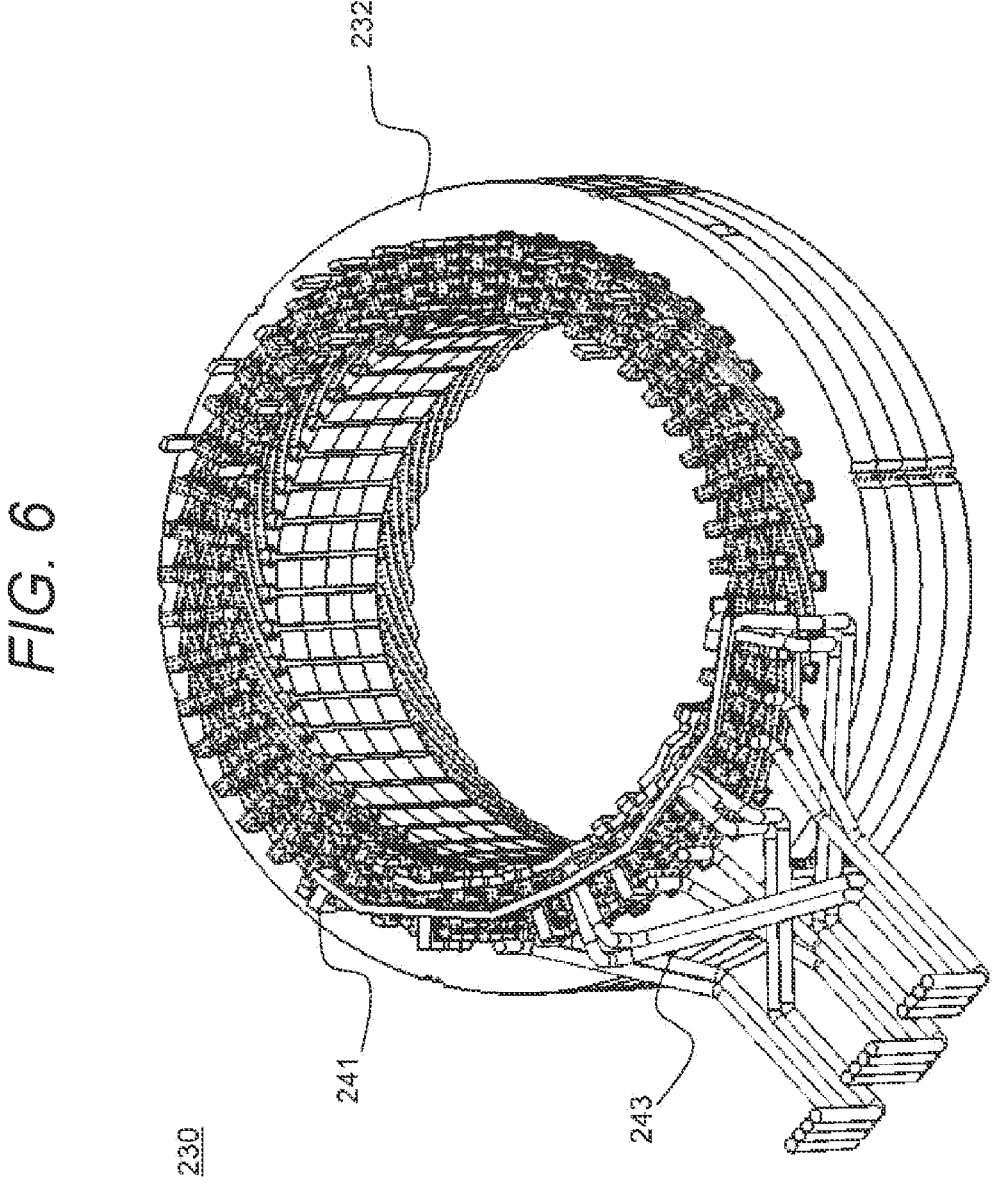
FIG. 6 is a view of a connection side of a stator according to the embodiment of the present invention.

FIG. 6 is a view of a connection side of the stator according to the embodiment.

FIG. 6 illustrates the stator 230 of FIG. 5 as viewed from behind, and illustrates the coil end 241 on the connection side. The coil end 241 on the connection side has a portion to which a connector (jumper conductor) 243 is attached. The connector 243 is a component connected to an output line 245 for connecting a slot conductor inserted into each of the slots of the stator core 232 with other device and concurrently, a component configured to connect ends of the coils.

In the present invention, the coil end 241 located opposite to the coil end on the connection side (i.e., the coil end 241 on a non-connection side) shown in FIG. 6 is connected to the slots at two types of slot pitches (as will be described later). With this configuration, the number of the connectors 243 is less prone to increase.

Figure 7:
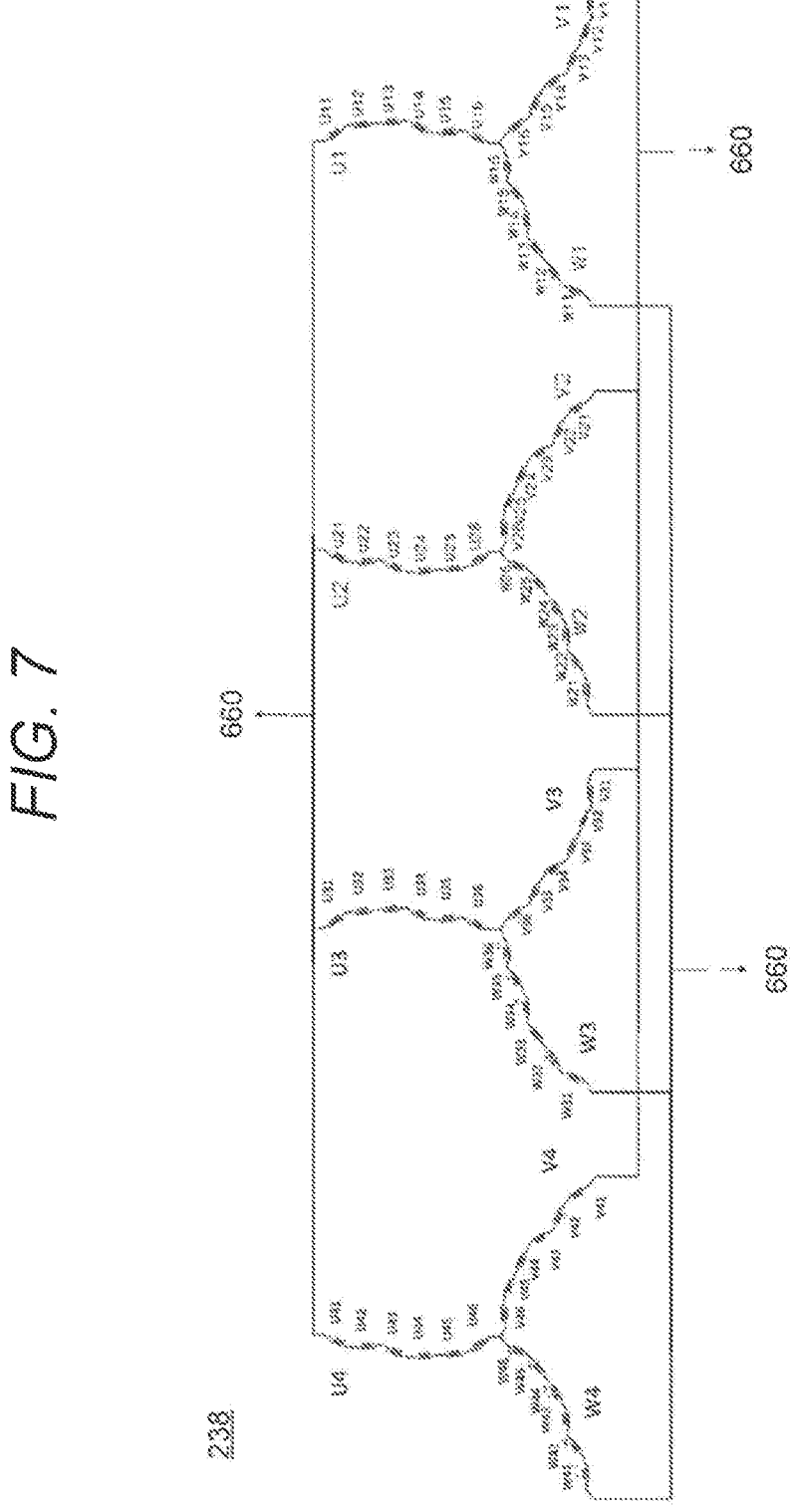
FIG. 7 is a connection diagram of a stator winding.

FIG. 7 is a connection diagram of the stator winding 238, and shows a connection method and an electrical phase relationship between the phase windings.

Here, a double-star connection method is applied to the stator winding 238; and a first star connection including a U1-phase winding group, a V1-phase winding group, and a W1-phase winding group of the present embodiment, a second star connection including a U2-phase winding group, a V2-phase winding group, and a W2-phase winding group, a third star connection including a U3-phase winding group, a V3-phase winding group, and a W3-phase winding group, and a fourth star connection including a U4-phase winding group, a V4-phase winding group, and a W4-phase winding group are connected in parallel. In other words, the stator winding 238 includes these phase winding groups, resulting in a plurality of parallel circuits for each of the three phases.

In the first star connection, the second star connection, the third star connection, and the fourth star connection, the U phases, the V phases, and the W phases are electrically connected to each other, and are connected to the current sensor 660.

Each of the U1-phase winding group, the V1-phase winding group, the W1 phase winding group, the U2-phase winding group, the V2 phase winding group, and the W2-phase winding group includes six circular windings. The U1-phase winding group includes circular windings U11, U12, U13, U14, U15, and U16; The V1-phase winding group includes circular windings V11, V12, V13, V14, V15, and V16; and the W1-phase winding group includes W11, W12, W13, W14, W15, and W16. The U2-phase winding group includes circular windings U21, U22, U23, U24, U25, and U26; The V2-phase winding group includes circular windings V21, V22, V23, V24, V25, and V26; and the W2-phase winding group includes W21, W22, W23, W24, W25, and W26. The U3-phase winding group includes circular windings U31, U32, U33, U34, U35, and U36; The V3-phase winding group includes circular windings V31, V32, V33, V34, V35, and V36; and the W3-phase winding group includes W31, W32, W33, W34, W35, and W36. The U4-phase winding group includes circular windings U41, U42, U43, U44, U45, and U46; The V4-phase winding group includes circular windings V41, V42, V43, V44, V45, and V46; and the W4-phase winding group includes W41, W42, W43, W44, W45, and W46.

The U phase, the V phase, and the W phase have a substantially similar configuration, and are arranged such that a phase of voltage induced by each of the U phase, the V phase, and the W phase is offset by 120 degrees in electric angle. Additionally, an angle of each of the circular windings represents a relative phase. Note that with regard to the connection method, a single-star (1Y) connection method may be applied to the stator winding by connecting each in series based on drive voltage of the corresponding rotary electric machine.

Figure 8:
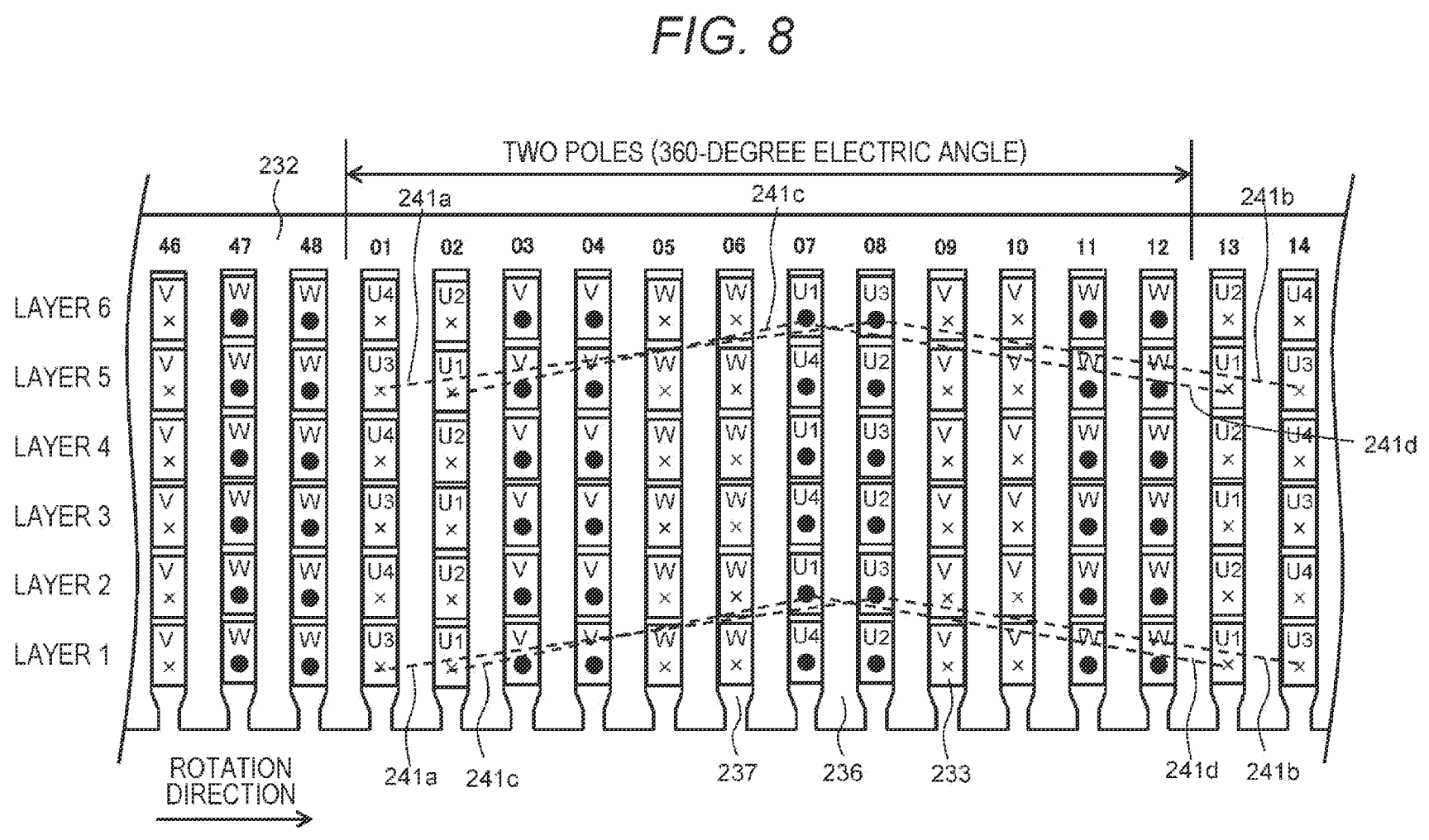

FIG. 8 is a first layout diagram of the connectors according to the embodiment of the present invention. FIG. 8 shows the slots with slot Nos. 46 to 13 horizontally, and shows a rotation direction of the rotor in a direction of left to right on the drawing.

The stator core 232 has two poles, or in other words, the slots 237, the number of which is 12, are arranged at 360-degree electric angle, and for example, the slot Nos. 01 to 12 correspond to the two poles (360-degree electric angle). With this configuration, the number of the slots per pole N is 6, and the number of the slots per pole and phase Nspp is 2 (6 as the number of the slots per pole split by 3 as the number of the phases). The stator winding 238 includes a slot conductor 233, and six of the slot conductors 233 are inserted into each of the slots 237.

Each of the slot conductors 233 is inserted into the corresponding slot of the stator core 232 to form any one of a plurality of layers, and is illustrated in a rectangular shape. In the rectangular shape, the U phase, the V phase, and the W phase are respectively denoted with reference signs U1 to U4, V, and W; a current flow direction from a side (the connection side, i.e., the front of the drawing), on which the lead wire is placed, to the opposite side (the non-connection side, i.e., the rear of the drawing) is denoted with "x"; and a reverse current flow direction (i.e., from the rear to the front of the drawing) is denoted with "•".

The slot conductors 233 are located from innermost peripheries (slot openings) to outermost peripheries (slot bottoms) of the slots 237; and these slot conductors 233 are, sequentially from the innermost peripheries to the outermost peripheries, referred to as a layer 1, a layer 2, a layer 3, a layer 4, a layer 5, and a layer 6.

Here, while each of the slot conductors 233 in the U phase is denoted with U1 to U4 (indicating the corresponding phase winding group), the slot conductors 233 in the V phase and the W phase are only denoted with V and W (indicating the phases). The slot conductors 233 in the U phase are denoted with U1 to U4 as the phase winding groups, based on the number (i.e., four) of the parallel circuits as a technical concept of the present invention. The U phase will be described below as representative in the embodiment.

In the present invention, with the coil on the non-connection side, two types of slot pitches are applied: a slot pitch Np=N and a slot pitch Np=N+2.

FIG. 8 shows crossover conductors 241*a*, 241*b*, 241*c*, and 241*d*. The crossover conductors 241*a* to 241*d* connect ends of the slot conductors 233, each of which is inserted into a different slot, to form the coil end 241, the ends placed at a same side of the slot conductors 233. Each of the crossover conductors 241*a* and 241*b* is included in the U3-phase winding group, and each of the crossover conductors 241*c* and 241*d* is included in the U1-phase winding group. Further, each of the crossover conductors 241*a* and 241*c* is located as a part of the coil end 241 on the non-connection side, and each of the coil ends 241*b* and 241*d* is located as a part of the coil end 241 on the connection side.

The crossover conductor 241*a*, included in the U3-phase winding group and located at the coil end on the non-connection side, connects the slot conductors 233 at a seven-slot pitch. Specifically, the crossover conductor 241*a* located in the layer 5 and the layer 6 connects the layer 5 in slot No. 01 with the layer 6 in slot No. 08. The crossover conductor 241*c*, included in the U1-phase winding group and located at the coil end on the non-connection side, connects the slot conductors 233 at a five-slot pitch. Specifically, the crossover conductor 241*c* located in the layer 5 and the layer 6 connects the layer 5 in slot No. 02 with the layer 6 in slot No. 07.

The crossover conductor 241*b* and the crossover conductor 241*d*, included in different U phase winding groups and located at the coil end on the connection side, connect the slot conductors 233 at a six-slot pitch. Specifically, the crossover conductor 241*b* located in the layer 5 and the layer 6 connects the layer 5 in slot No. 14 with the layer 6 in the slot No. 08. Concurrently, the crossover conductor 241*d* located in the layer 5 and the layer 6 connects the layer 5 in slot No. 13 with the layer 6 in the slot No. 07.

The coil ends 241*a* to 241*d* connect the slot conductors 233 located in the layer 1 and layer 2 in a similar method to the method used in the layer 5 and the layer 6. Thus, a detailed description thereof will be omitted.

As has been described above, at the coil end on the non-connection side, the crossover conductors 241*a* and 241*c* use the two types of slot pitches: one as a first crossover conductor using a slot pitch Np=N1 and the other as a second crossover conductor using a slot pitch Np=N1+2, where N1 represents a predetermined natural number. Then, the crossover conductor 241*a* and the crossover conductor 241*c* are alternately arranged in the circumferential direction of the stator core 232.

Specifically, the crossover conductor 241*c* crosses over the slots between the slot conductors 233 at a slot pitch Np=5 to connect the slot conductors 233, and the crossover conductor 241*a* crosses over the slots between the slot conductors 233 at a slot pitch Np=7 to connect the slot conductors 233, where N1 represents 5. Concurrently, at the coil end on the connection side, each of the crossover conductors 241*b* and 241*d* uses a slot pitch Np=N2 as a third crossover conductor, where N2 represents the predetermined natural number. Then, the crossover conductor 241*b* and the crossover conductor 241*d* are arranged in the circumferential direction of the stator core 232. Specifically, the crossover conductors 241b and 241d respectively crossover the slots between the slot conductors 233 at a slot pitch Np=6 to connect the slot conductors 233, where N2 represents 6. Accordingly, provided is a stator for a rotary electric machine, the stator configured, even in the four parallel circuits, not to generate a phase difference and not to increase the number of the connectors 243 as has been described with reference to FIG. 6.

The principle of the present invention will be described. As a means for increasing motor output, on assumption that the motor output is obtained by subtracting losses from power input, an increase in the power input or a decrease in the losses is to be applied.

In the present invention, as the means for increasing the motor output, the increase of the power input is applied by increasing the number of the parallel circuits from two to four. As a result, the current per circuit drops down to a half to a quarter of a phase current. With this configuration, the phase current is increased without an increase in current density, and the power input is increased while an area for each of the conductors is maintained. As a result, the motor output is increased. Further, the increase in the number of the parallel circuits leads to a decrease in copper loss. A conventional solution is to increase the area for each of the conductors only; and herein, the number of the parallel circuits is increased, resulting in a decreased length of the coil per circuit. Accordingly, the decrease in the losses as well as the increase in the motor output are achieved.

Here, in order to prevent circulating current induced in response to the increased number of the parallel circuits, the coils need to be arranged in the stator such that the phase difference is not generated in the parallel circuits. The circulating current causes an unwanted current to flow, so that concerns, such as degraded controllability, heat generation, and increase in noise, oscillation, unstable torque control, or losses, may arise at start-up of the motor.

In the conventional configuration where at the coil ends on the non-connection side, all the coils are arranged at the same slot pitch, as a countermeasure against the phase difference, each of the slot conductors needs to be jumper-connected to the corresponding slot conductor at the next layer when the corresponding coil is wound around a half circumference of the stator core 232. In this state, at one area for each circuit, the slot conductors in a same layer need to be connected. In response to this connection, the number of the connectors need to be increased.

In a contrast, in the present invention, in the same phase winding group, the crossover conductors use the two types of slot pitches at the coil end on the non-connection side, or in other words, one of the crossover conductors uses the slot pitch Np=N1 as the first crossover conductor and the other of the crossover conductors uses the slot pitch Np=N1+2 as the second crossover conductor. With this configuration, each of the slot conductors is jumper-connected to the corresponding slot conductor when the corresponding coil is wound around a whole circumference of the stator core 232, and the number of the connectors are less prone to increase compared with the conventional configuration. Further, even in the increased number of the parallel circuits, the area for each of the conductors is maintained, and a large current flows without the increase in current density. As a result the motor output is increased.

Note that in this embodiment, the connector connects the slot conductor located at a 2n-th layer near an inner periphery of the rotary electric machine with the slot conductor located at a 2n+1-th layer near the inner periphery, where n represents a natural number.

Further, at the coil end on the connection side, a first slot conductor connected to the output line and a second slot conductor connected to the connector are located in the same slot (slot having the same slot number), and the first slot conductor is located in the layer 6 as an outermost one of the layers 1 to 6.

FIGS. 9 to 12 are second to fifth layout diagrams of the connectors.

Each of the connector layouts shown in FIGS. 9 to 12 will be described. In each of FIGS. 9 to 12, as a modification of FIG. 8, the two types of slot pitches, i.e., the slot pitch Np=N1 and the slot pitch Np=N1+2, are applied on the non-connection side; and thus, a detailed description of the similar configuration to FIG. 8 will be omitted.

Figure 9:
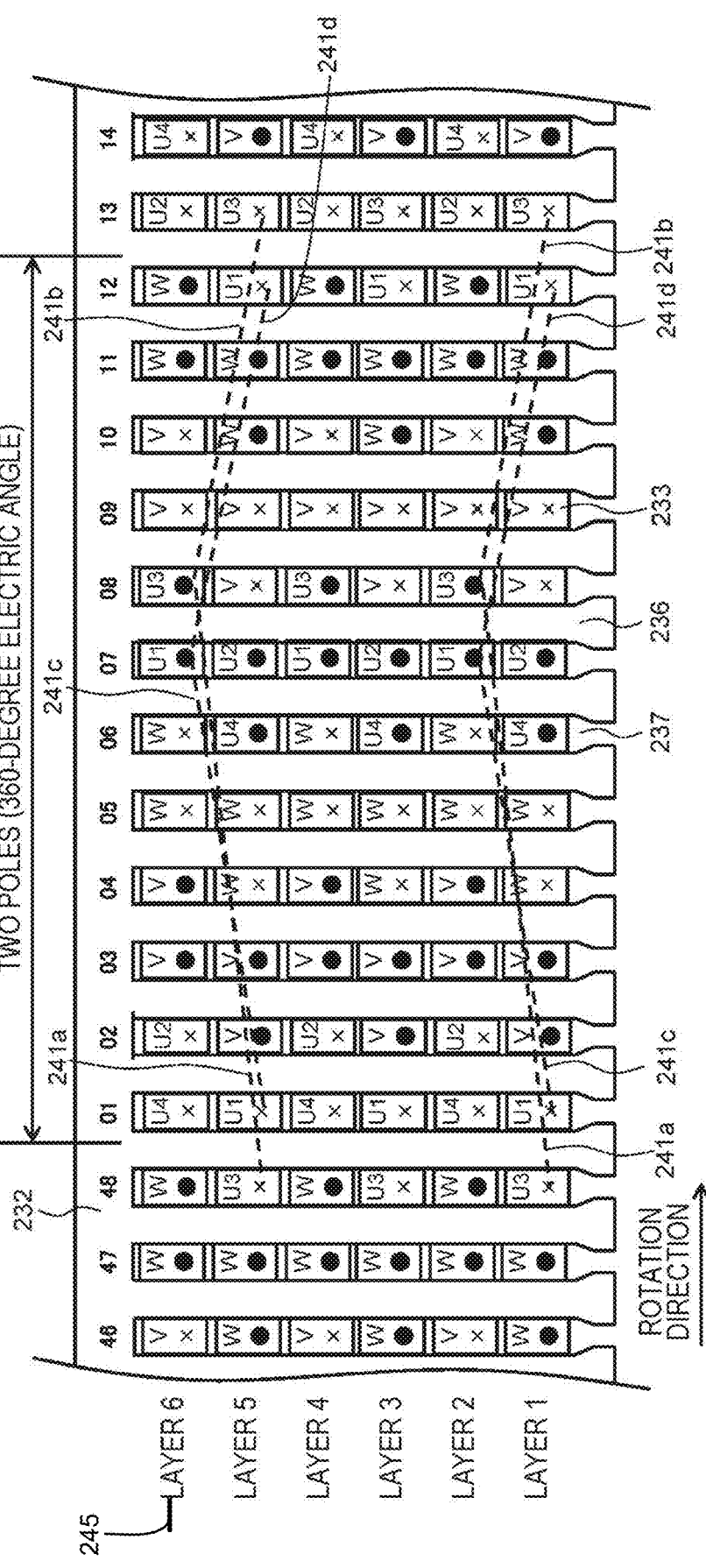
FIG. 9 is a second layout diagram of the connectors according to the embodiment of the present invention.
Figure 11:
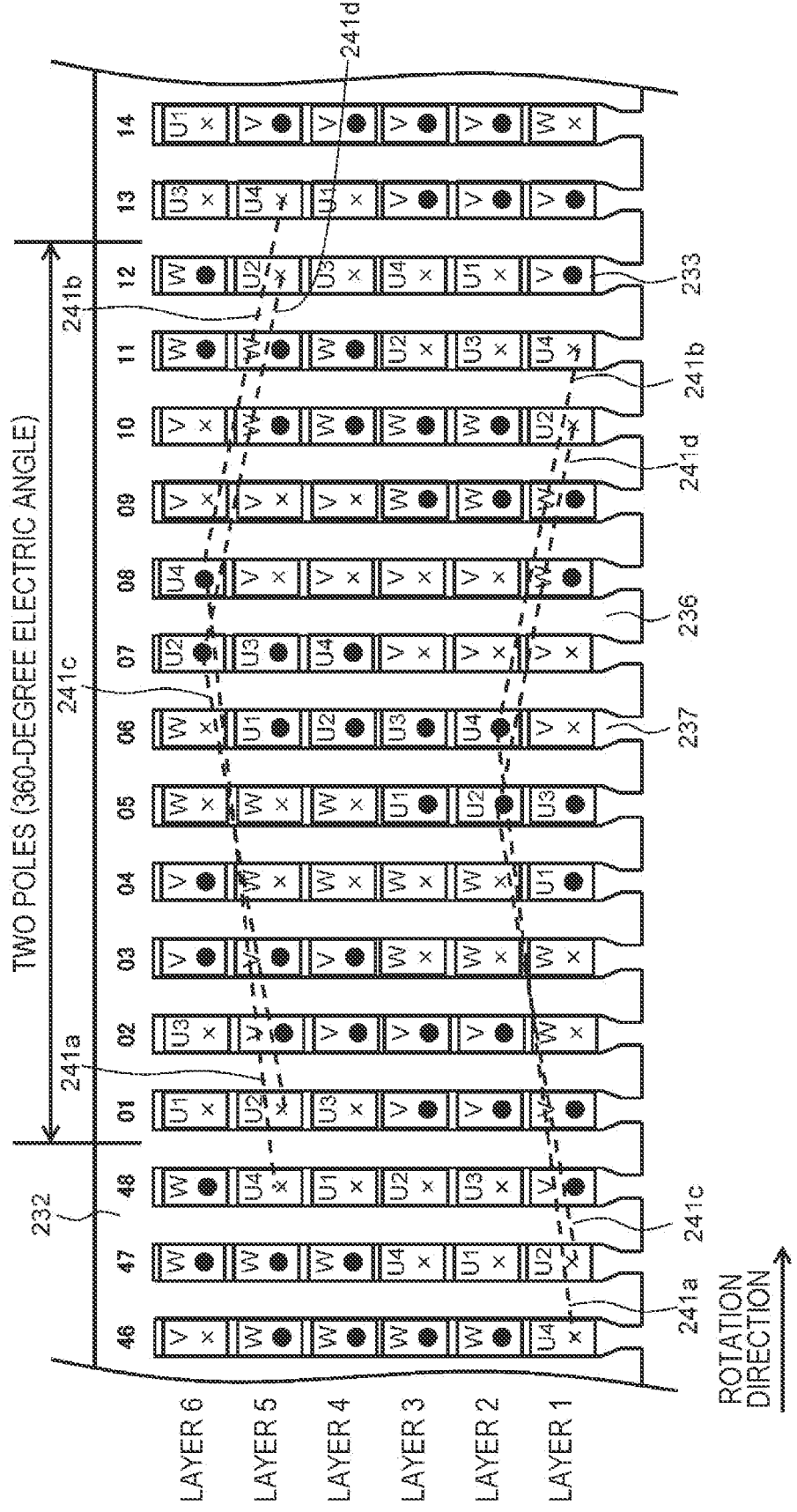
FIG. 11 is a fourth layout diagram of the connectors according to the embodiment of the present invention.

In FIGS. 9 and 11, at the coil end on the non-connection side, the crossover conductor 241a connects the slot conductors 233 at an eight-slot pitch, and the crossover conductor 241c connects the slot conductors 233 at the six-slot pitch. At the coil end on the connection side, the crossover conductors 241b and 241d respectively connect the slot conductors 233 at the five-slot pitch.

In other words, at the coil end on the non-connection side, the crossover conductor 241c uses the slot pitch Np=N1, and the crossover conductor 241a uses the slot=N1+2, where N1 represents 6. In this state, N1 equals N as the number of the slots per pole. Concurrently, at the coil end on the connection side, each of the crossover conductors 241b and 241d uses the slot pitch Np=N2, where N2 represents 5. Here, N2 equals (N1−1).

Figure 10:
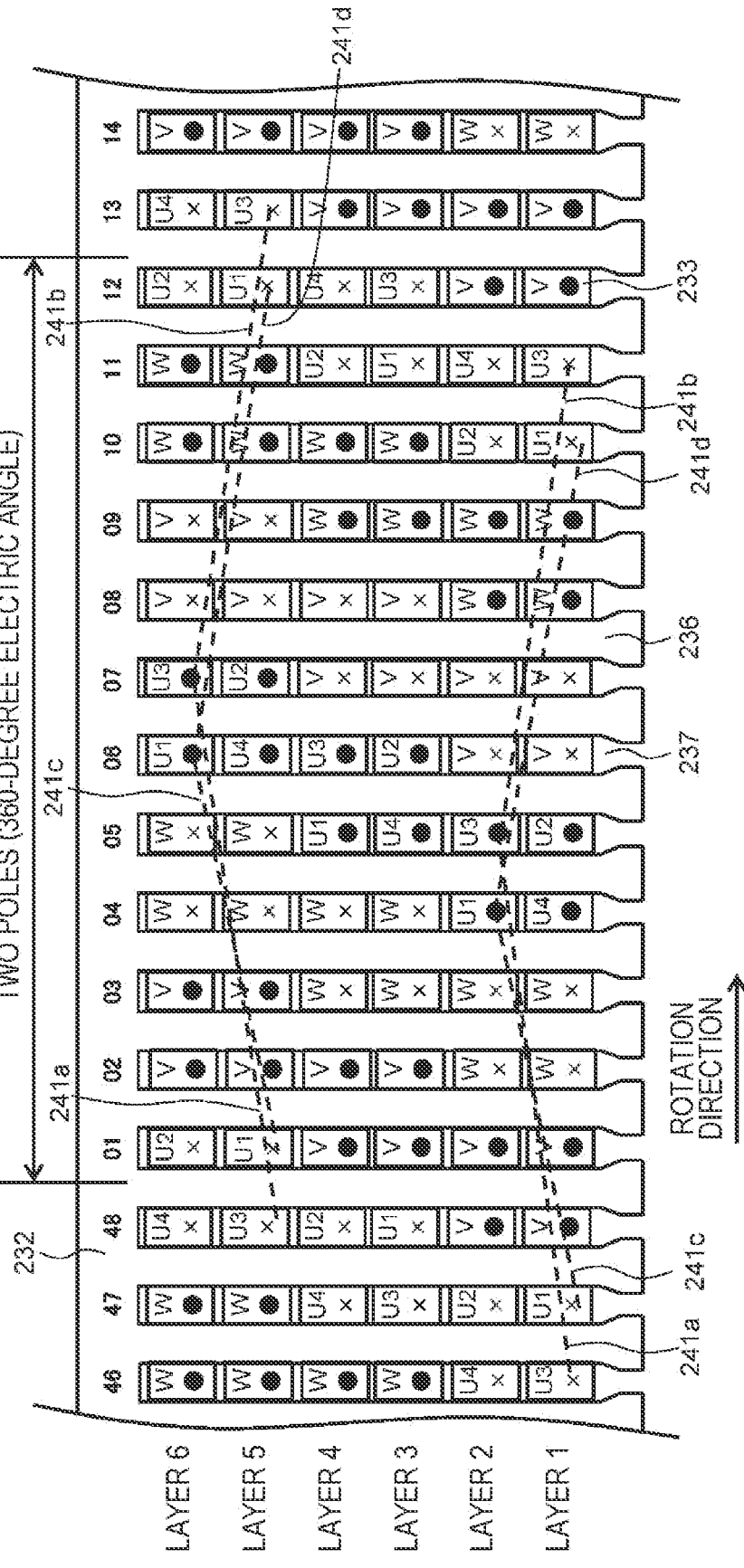
FIG. 10 is a third layout diagram of the connectors according to the embodiment of the present invention.
Figure 12:
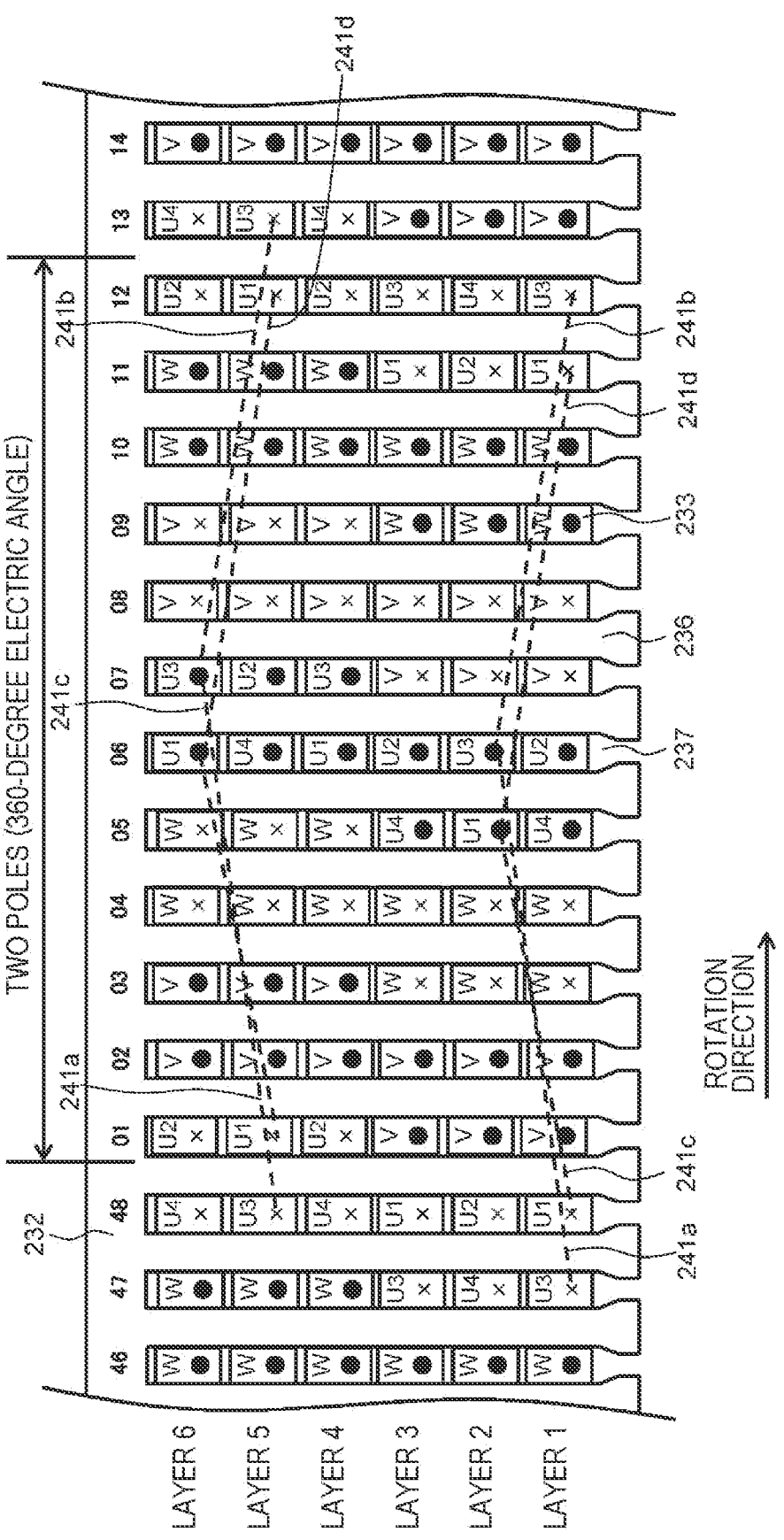
FIG. 12 is a fifth layout diagram of the connectors according to the embodiment of the present invention.
Figure 13:
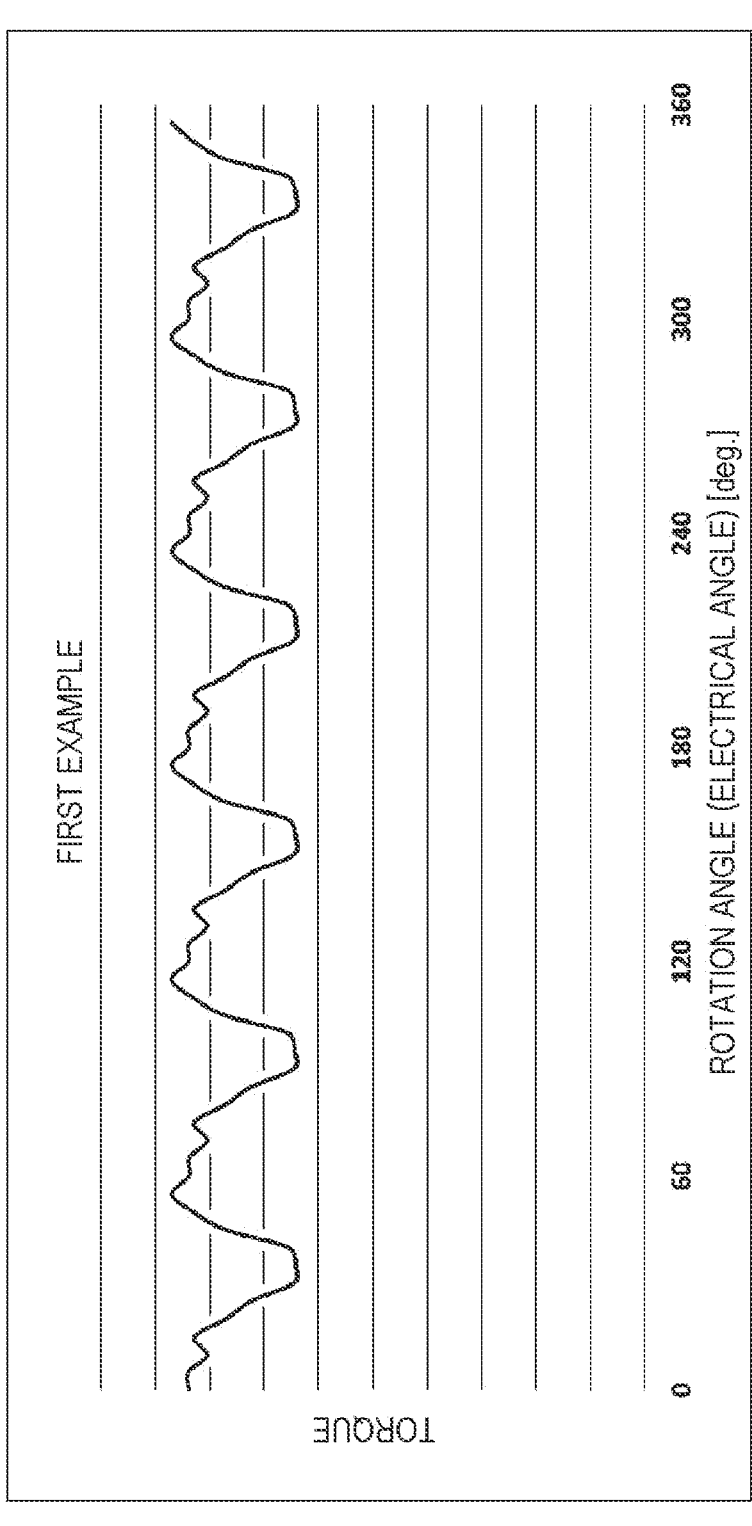
FIG. 13 is a torque waveform diagram in the first connector layout of FIG. 8.
Figure 14:
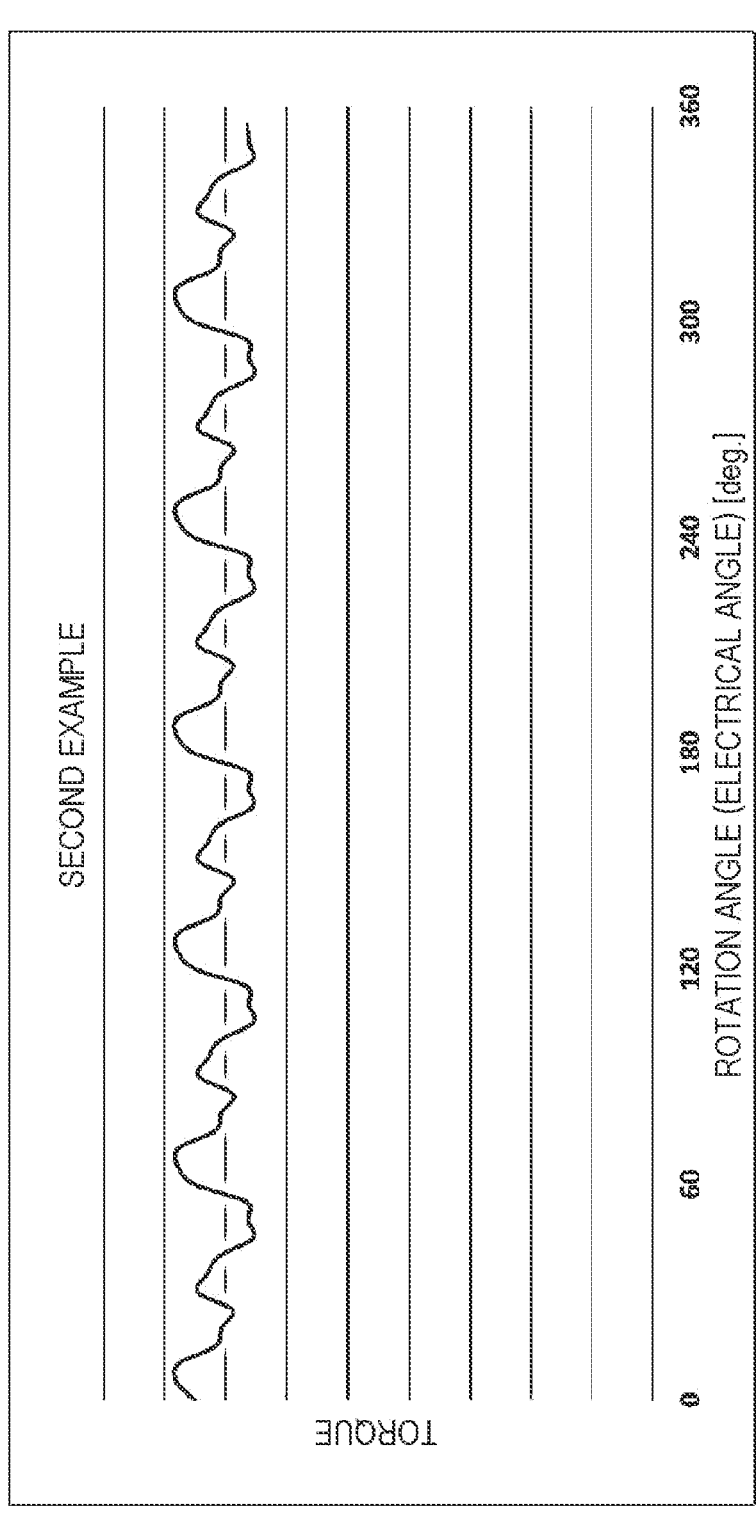
FIG. 14 is a torque waveform diagram in the second connector layout of FIG. 9.
Figure 15:
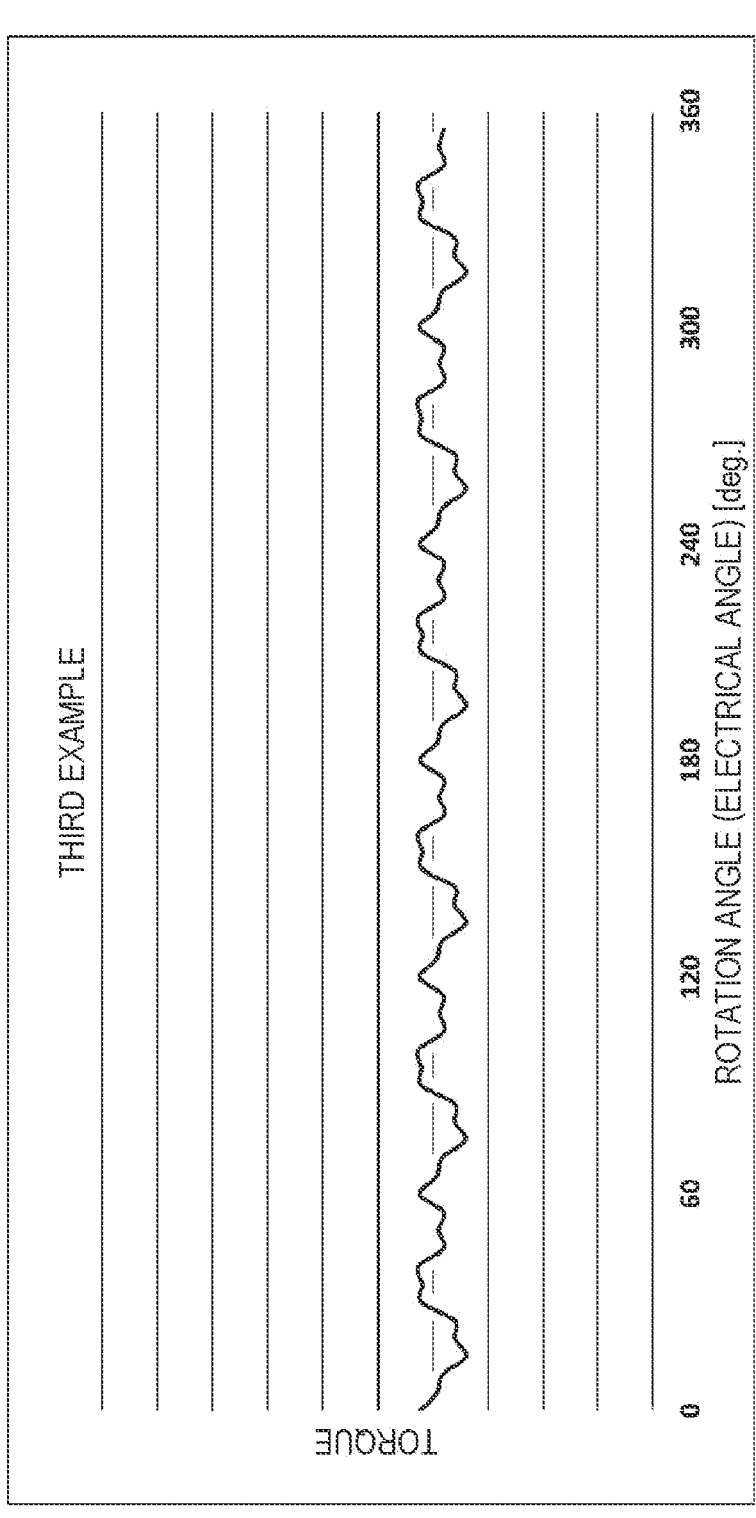
FIG. 15 is a torque waveform diagram in the third connector layout of FIG. 10.
Figure 16:
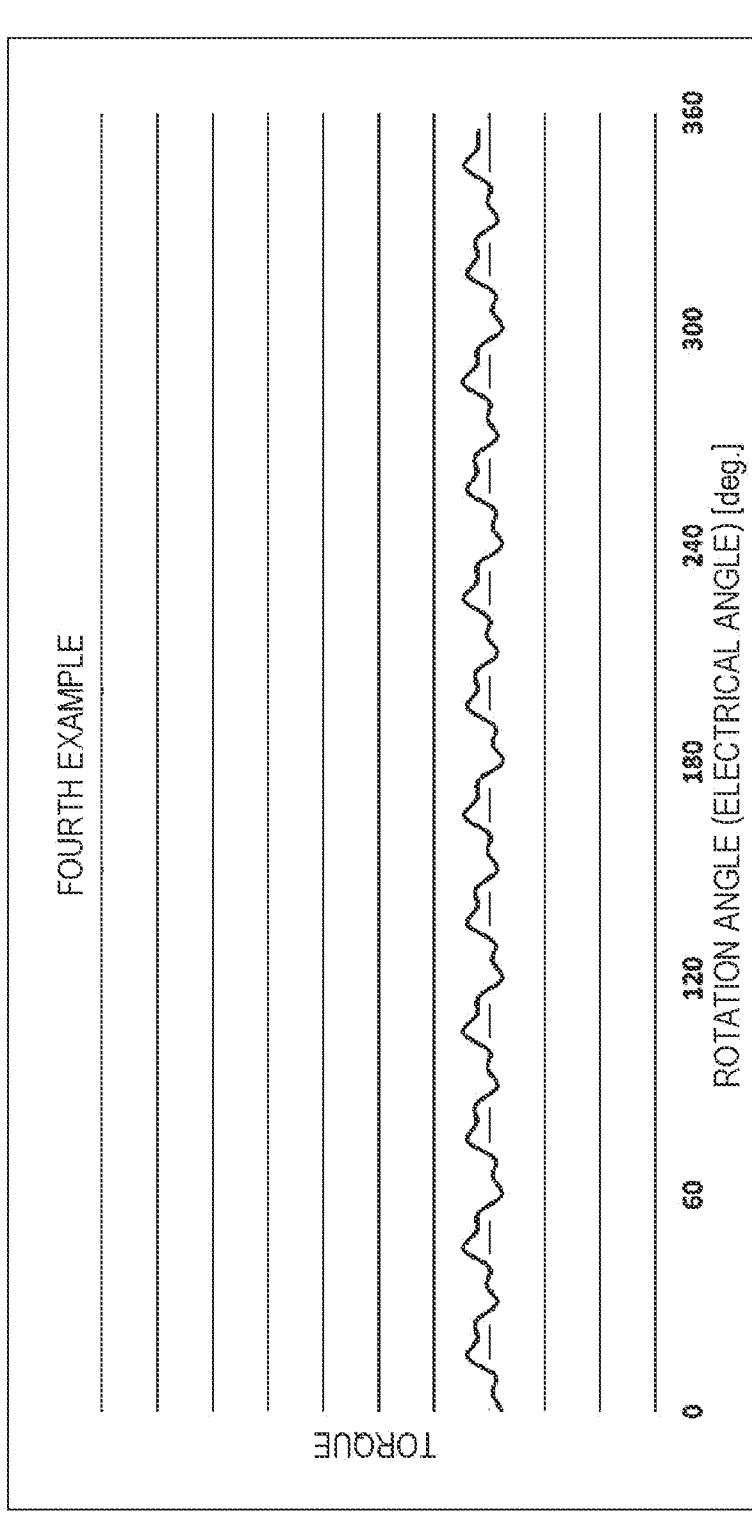
FIG. 16 is a torque waveform diagram in the fourth connector layout of FIG. 11.
Figure 17:
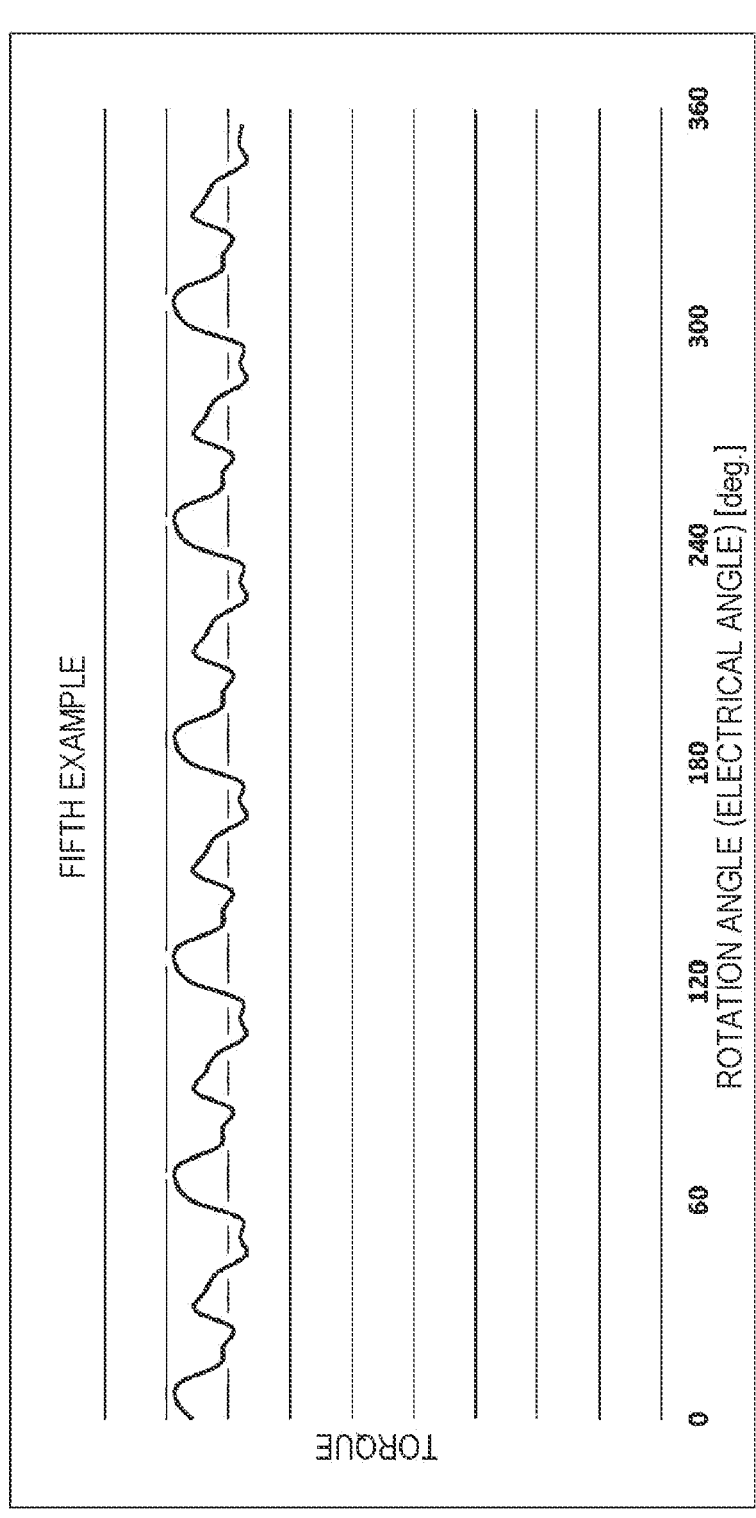
FIG. 17 is a torque waveform diagram in the fifth connector layout of FIG. 12.

In FIGS. 10 and 12, at the coil end on the non-connection side, the crossover conductor 241a connects the slot conductors 233 at the seven-slot pitch, and the crossover conductor 241c connects the slot conductors 233 at the five-slot pitch. At the coil end on the connection side, the crossover conductors 241b and 241d respectively connect the slot conductors 233 at the six-slot pitch.

In other words, at the coil end on the non-connection side, the crossover conductor 241c uses the slot pitch Np=N1, and the crossover conductor 241a uses the slot pitch Np=N1+2, where N1 represents 5. Concurrently, at the coil end on the connection side, each of the crossover conductors 241b and 241d uses the slot pitch Np=N2, where N2 represents 6. Here, N2 equals (N1+1).

Figure 18:
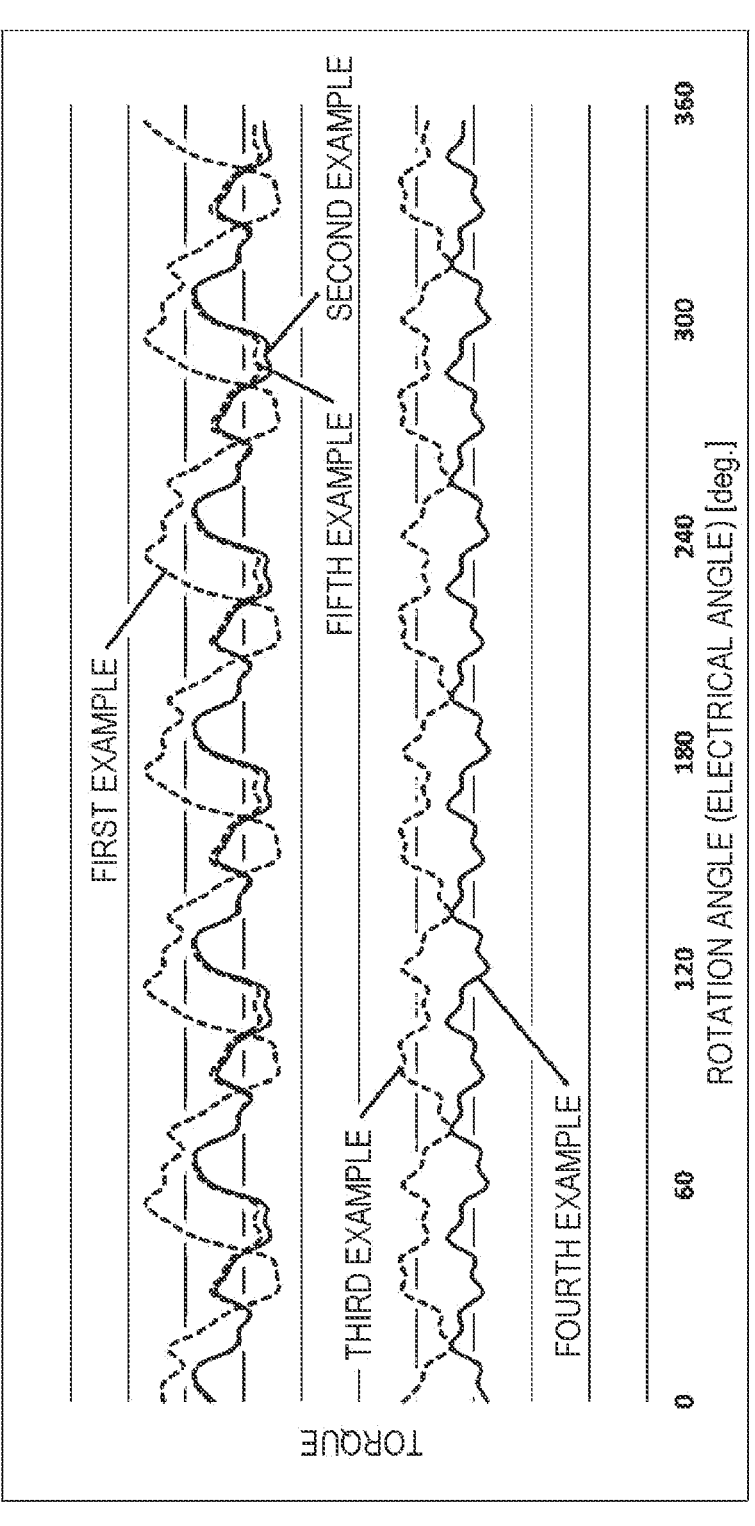
FIG. 18 shows a comparison in torque waveform between the first, second, third, fourth, and fifth connector layouts in FIG. 13.

FIGS. 13, 14, 15, 16, and 17 are respectively torque waveform diagrams of the connector layouts in FIGS. 8, 9, 10, 11 and 12. FIGS. 13, 14, 15, 16, and 17 respectively represent FIG. 8 as a first example, FIG. 9 as a second example, FIG. 10 as a third example, FIG. 11 as a fourth example, and FIG. 12 as a fifth example. FIG. 18 shows a comparison in torque waveform between the first, second, third, fourth, and fifth examples in FIGS. 13, 14, 15, 16, and 17. In each of the torque waveform diagrams, the vertical axis represents an amount of torque, and the horizontal axis represents a rotation angle (electrical angle).

FIG. 19 shows an example of arrangement of the coils in the second connector layout of FIG. 9. In FIG. 19, the arrangement of the coils in FIG. 9 corresponds to a pattern in the leftmost column of FIG. 19.

In the embodiment of the present invention, when viewed in the axial direction of the rotary electric machine, the connector of the present invention is located at an angle of (360°/L)×Nspp×2 between a virtual line connecting the connector with a center of a rotary shaft of the rotary electric machine and a virtual line connecting the output line with the center of the rotary shaft, where L represents the number of the parallel circuits.

The configurations in an embodiment of the present invention described above are effective as follows:

(1) A stator 230 for a rotary electric machine 200 (202) according to the present invention includes:

a stator core 232 including a plurality of slots 237; and a stator winding 238 including a plurality of wavy circular windings in a plurality of phases. The stator winding 238 includes: a slot conductor 233 inserted into each of the plurality of slots 237 of the stator core 232 to form any one of a plurality of layers; and crossover conductors 241a to 241d, each configured to connect ends of a pair of the slot conductors 233, each of which is inserted into a different one of the plurality of slots 237, to form a coil end 241, the ends placed at a same side of the pair of slot conductors 233. With the stator 230 for the rotary electric machine 200 (202), the stator winding 238 includes a plurality of phase winding groups configured to form a plurality of parallel circuits in each of the plurality of phases; the crossover conductor in each of the plurality of phase winding groups includes, at one of the coil ends, a first crossover conductor 241c configured to cross over the plurality of slots 237 between the pair of slot conductors 233 at Np=N1 to connect the pair of slot conductors 233, and a second crossover conductor 241a configured to cross over the plurality of slots 237 between the pair of slot conductors 233 at Np=N1+Nspp to connect the pair of slot conductors 233, where Np represents a slot pitch, N1 represents a predetermined natural number, and Nspp represents a number of the plurality of slots per pole and phase; and the first crossover conductor 241c and the second crossover conductor 241a are alternately arranged in a circumferential direction of the stator core 232. Accordingly, provided is the stator 230 for the rotary electric machine 200 (202) configured to decrease the number of connectors 243 and increase outputs.

(2) At another of the coil ends 241 of the stator core 232, the crossover conductor in the each of the plurality of phase winding groups includes a third crossover conductor 241b and a third crossover conductor 241d, each configured to cross over the plurality of slots 237 between the pair of slot conductors 233 at Np=N2 to connect the pair of slot conductors 233, where N2 represents the predetermined natural number. With this configuration, each of the slot conductors 233 is jumper-connected to the corresponding slot conductor when the corresponding coil is wound around the whole circumference of the stator core 232.

(3) At the other of the coil ends 241 (coil end on a connection side) of the stator core 232, the number of the plurality of slots per pole N2 is N1−1. With this configuration, each of the slot conductors 233 is jumper-connected to the corresponding slot conductor when the corresponding coil is wound around the whole circumference of the stator core 232.

(4) At the other of the coil ends 241 (coil end on the connection side) of the stator core 232, the number of the plurality of slots per pole N2 is N1+1. With this configuration, each of the slot conductors 233 is jumper-connected to the corresponding slot conductor when the corresponding coil is wound around the whole circumference of the stator core 232.

(5) With the stator core 232, N1 equals N, where N represents the number of the plurality of slots per pole. Accordingly, in the embodiment of the present invention, provided is the stator 230 for the rotary electric machine 200 (202) configured to decrease the number of connectors 243 and increase the outputs.

(6) At the other of the coil ends 241 of the stator core 232, the stator 230 further includes: an output line configured to connect the slot conductor 233 with another device; and a jumper conductor 243 configured to connect the slot conductor 233 located at a 2n-th one of the plurality of layers near an inner periphery of the rotary electric machine 200 (202) with the slot conductor 233 located at a 2n+1-th one of the plurality of layers near the inner periphery, where n represents a natural number. Accordingly, in the embodiment of the present invention, provided is the stator 230 for the rotary electric machine 200 (202) configured to decrease the number of connectors 243 and increase the outputs.

(7) When viewed in an axial direction of the rotary electric machine 200 (202), the jumper conductor 243 is located at an angle of $(360°/L) \times Nspp \times 2$ between a virtual line connecting the jumper conductor 243 with a center of a rotary shaft of the rotary electric machine and a virtual line connecting the output line with the center of the rotary shaft, where L represents the number of the parallel circuits. Accordingly, in the embodiment of the present invention, provided is the stator 230 for the rotary electric machine 200 (202) configured to decrease the number of connectors 243 and increase the outputs.

(8) A first slot conductor connected to the output line and a second slot conductor connected to the jumper conductor 243 are located in a same one of the plurality of slots 237, and the first slot conductor is located at an outermost one of the plurality of layers. Accordingly, in the embodiment of the present invention, provided is the stator 230 for the rotary electric machine 200 (202) configured to decrease the number of connectors 243 and increase the outputs.

(9) A rotary electric machine 200 (202) according to an embodiment of the present invention includes the stator 230, and a rotor 250 opposing the stator 230 at a predetermined distance from the stator 230 of the rotary electric machine. Accordingly, provided is the rotary electric machine 200 (202) configured to decrease the number of the connectors 243 and increase the outputs.

It should be noted that the present invention is not limited to the foregoing embodiment, and any change, addition, or modification appropriately made within the spirit of the present invention will naturally fall within the scope of claims of the present invention. Further, each of configurations in the foregoing embodiment is to be considered in all respects as merely illustrative for convenience of description, and thus is not restrictive; and any addition, removal, or replacement of the configurations may be partially made.

REFERENCE SIGNS LIST 100 vehicle
200, 202 rotary electric machine
212 housing
214 end bracket
218 shaft
222 air gap
224 resolver 226 wear plate
230 stator
232 stator core
233 slot conductor
236 teeth
237 slot
238 stator winding
241 coil end
241*a* crossover conductor on non-connection side
241*b* crossover conductor on connection side
241*c* crossover conductor on non-connection side
241*d* crossover conductor on connection side
242 lead wire
243 connector (jumper conductor)
250 rotor
252 rotor core
253 pit
254, 254*a*, 254*b* permanent magnet
257 pit space
600 power converter
610, 620 power module
660 current sensor

The invention claimed is:

1. A stator for a rotary electric machine, the stator comprising:

a stator core including a plurality of slots; and a stator winding including a plurality of wavy circular windings in a plurality of phases, the stator winding including a slot conductor inserted into each of the plurality of slots of the stator core to form any one of a plurality of layers, and a crossover conductor configured to connect ends of a pair of the slot conductors, each of which is inserted into a different one of the plurality of slots, to form a coil end, the ends placed at a same side of the pair of slot conductors, wherein the stator winding includes a plurality of phase winding groups configured to form a plurality of parallel circuits in each of the plurality of phases, the crossover conductor in each of the plurality of phase winding groups includes, at one of the coil ends, a first crossover conductor configured to cross over the plurality of slots between the pair of slot conductors at Np=N1 to connect the pair of slot conductors, and a second crossover conductor configured to cross over the plurality of slots between the pair of slot conductors at Np=N1+Nspp to connect the pair of slot conductors, where Np represents a slot pitch, N1 represents a predetermined natural number, and Nspp represents a number of the plurality of slots per pole and phase, and the first crossover conductor and the second crossover conductor are alternately arranged in a circumferential direction of the stator core, wherein the stator further comprises at the other of the coil ends:

an output line configured to connect the slot conductor with another device; and a jumper conductor configured to connect the slot conductor located at a 2n-th one of the plurality of layers near an inner periphery of the rotary electric machine with the slot conductor located at a 2n+1-th one of the plurality of layers near the inner periphery, where n represents a natural number.

2. The stator for a rotary electric machine according to claim 1, wherein at another of the coil ends, the crossover conductor in the each of the plurality of phase winding groups includes a third crossover conductor configured to cross over the plurality of slots between the pair of slot conductors at Np=N2 to connect the pair of slot conductors, where N2 represents the predetermined natural number.

3. The stator for a rotary electric machine according to claim 2, wherein N2 equals (N1−1).

4. The stator for a rotary electric machine according to claim 2, wherein N2 equals (N1+1).

5. The stator for a rotary electric machine according to claim 1, wherein N1 equals N, where N represents a number of the plurality of slots per pole.

6. The stator for a rotary electric machine according to claim 1, wherein when viewed in an axial direction of the rotary electric machine, the jumper conductor is located at an angle of (360°/L)× Nspp×2 between a virtual line connecting the jumper conductor with a center of a rotary shaft of the rotary electric machine and a virtual line connecting the output line with the center of the rotary shaft, where L represents a number of the plurality of parallel circuits.

7. The stator for a rotary electric machine according to claim 1, further comprising:

a first slot conductor connected to the output line; and a second slot conductor connected to the jumper conductor, wherein the first slot conductor and the second slot conductor are located in a same one of the plurality of slots, and the first slot conductor is located at an outermost one of the plurality of layers.

8. A rotary electric machine comprising:

the stator for a rotary electric machine according to claim 1; and a rotor opposing the stator at a predetermined distance from the stator.

* * * * *